US006404762B1

United States Patent
Luzeski et al.

(10) Patent No.: US 6,404,762 B1
(45) Date of Patent: Jun. 11, 2002

(54) UNIVERSAL MESSAGING SYSTEM PROVIDING INTEGRATED VOICE, DATA AND FAX MESSAGING SERVICES TO PC/WEB-BASED CLIENTS, INCLUDING A SESSION MANAGER FOR MAINTAINING A SESSION BETWEEN A MESSAGING PLATFORM AND THE WEB-BASED CLIENTS

(75) Inventors: Nicholas M. Luzeski, Paoli; Daniel P. Meyer, Downingtown; Allie A. Murphy, Frazer; John L. Homan, Ephrata; Gary Paul Russell, King of Prussia, all of PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/094,126

(22) Filed: Jun. 9, 1998

(51) Int. Cl.[7] .............................................. H04L 12/28
(52) U.S. Cl. ...................... 370/352; 370/230; 370/235; 370/401; 370/428; 709/206; 379/88.1
(58) Field of Search ............................... 370/428, 230, 370/235, 401, 352; 709/206; 379/88.1

(56) References Cited

U.S. PATENT DOCUMENTS

| | | | | |
|---|---|---|---|---|
| 5,633,916 A | * | 5/1997 | Goldhagen | 379/67 |
| 5,794,039 A | * | 8/1998 | Guck | 395/683 |
| 5,812,795 A | * | 9/1998 | Horovitz | 395/200 |
| 5,870,549 A | * | 2/1999 | Bobo | 395/200.36 |
| 5,951,638 A | * | 9/1999 | Hoss | 109/206 |
| 5,991,365 A | * | 11/1999 | Pizano | 379/88.13 |
| 6,073,165 A | * | 6/2000 | Narasimhan | 709/206 |
| 6,163,536 A | * | 12/2000 | Dunn | 370/352 |

* cited by examiner

Primary Examiner—Hassan Kizou
Assistant Examiner—Roberta Stevens
(74) Attorney, Agent, or Firm—Woodcock Washburn; Mark T. Starr

(57) ABSTRACT

A Universal Messaging system provides e-mail, voice-mail and fax-mail services to subscribers that may utilize the Internet to access their messages. The system integrates an e-mail messaging system with a voice/fax messaging system on a messaging platform computer. E-mail messages are stored in an e-mail message store, and voice and/or fax messages are stored in a separate store controlled, e.g., by a Voice Mail Message Manager (VMMM). Subscribers can access messages from a personal computer via the Internet using a standard Web browser with an applet that present each subscriber with a "universal inbox" that displays all of that subscriber's voice, fax, and e-mail messages. A Web platform controls the Web browser interface to the messaging platform, accepting requests from the Web browser (such as a request to read an e-mail or listen to a voice mail) and passing prescribed types of information back to the Web browser. The Web platform interfaces with the messaging platform via a generic TCP/IP interface/router. A Session Manager application manages the Web browser's "session" with the messaging system. A CMC layer in the messaging platform provides the "glue" to enable communication and control between and among the different message stores. The CMC layer provides an industry standard mechanism for providing a standard API through which access to proprietary message stores can be made.

32 Claims, 15 Drawing Sheets

UNIVERSAL MESSAGING SYSTEM PROVIDING INTEGRATED VOICE, DATA AND FAX MESSAGING SERVICES TO PC/WEB-BASED CLIENTS, INCLUDING A SESSION MANAGER FOR MAINTAINING A SESSION BETWEEN A MESSAGING PLATFORM AND THE WEB-BASED CLIENTS

CROSS REFERENCE TO RELATED APPLICATIONS

The subject matter disclosed herein is related to the subject matter disclosed in co-pending U.S. patent application Ser. No. 09/093,593, filed on even date herewith, titled "Universal Messaging System Providing Integrated Voice, Data and Fax Messaging Services to PC/Web-based Clients, Including a Content Manager for Receiving Information from Content Providers and Formatting the Same into Multimedia Containers for Distribution to Web-based Clients"; and U.S. patent application Ser. No. 09/094,266, filed on even date herewith, titled "Universal Messaging System Providing Integrated Voice, Data and Fax Messaging Services to PC/Web-based Clients, Including a Large Object Server for Efficiently Distributing Voice/Fax Messages to Web-based Clients".

FIELD OF THE INVENTION

The present invention relates generally to messaging systems, e.g., voice-mail and e-mail systems, and more particularly to a Universal Messaging system providing integrated voice, data and fax messaging services to PC-based, including Web-based, clients.

BACKGROUND OF THE INVENTION

Universal Messaging enables subscribers to realize the benefits of unified messaging, which consolidates the notification, presentation and management of voice, fax and e-mail messages. With Universal Messaging, a subscriber need only check a single notification device for new messages. Such notification may be provided, e.g., by an e-mail message, message waiting indicator light, stutter dial tone, pager and/or an automatic outdial phone call.

Universal Messaging may also include consolidated message presentation. For example, instead of using a telephone handset to pick up voice messages, a fax machine to pick up fax messages, and a PC to pick up e-mail messages, a subscriber could process all his or her messages with a telephone handset or a multimedia PC, or the like.

A first aspect of the invention disclosed herein relates to the "session-based" character of many messaging systems, including systems providing combined e-mail and voice/fax mail services. In a session-based system, the user enters his or her password and is logged into a "session," i.e., an active communications connection between computers or applications over a network. A session is basically a data conversation between two devices, such as a dumb terminal and a mainframe. If the session is terminated for any reason, the user must log back in. In contrast, the Internet (e.g., World Wide Web, or simply Web) may be considered sessionless, since it is based on a request-response paradigm that uses the HTTP protocol. No actual session is created when a Web browser accesses a "page" of the Web. What occurs is that the browser issues an HTTP request to a Web server hosting that page, and the Web server transfers the HTML code for the page to the browser; but no session is maintained. Any subsequent access of that Web page or to links within that page are performed using another HTTP request/response sequence.

To make a Universal Messaging system compatible with a "sessionless" Web browser interface, it would be advantageous to provide a way to initiate and maintain a session with respect to the voice/fax messaging components of the system. Since a voice messaging system typically handles interactions with callers or subscribers via a telephone, a very session-based connection, there would be a benefit in making interactions with PC-based clients, including those utilizing a sessionless Web connection, appear to the voice/fax messaging component as if coming from a session-based interface, such as a telephone handset. Consider, for example, the case of a very large messaging system having thousand or hundreds of thousands of subscribers. If such a system were to provide access to PC or Web-based clients, a great strain would be placed on the system if such clients were required to "log on" (i.e., enter a user name and password) each and every time an HTTP request were sent to the messaging system. One aspect of the present invention addresses this problem.

A second aspect of the present invention concerns the need to provide support for new message types specifically targeted for the delivery of multimedia content. Such message types will preferably be ignored by normal e-mail clients but will be visible to clients specifically adapted to recognize them. The present invention provides a solution to this challenge by providing a novel approach to controlling access to different types of content in a messaging system. This aspect of the invention permits the use of existing Universal Messaging platform capabilities to address, store, transport, and deliver multimedia content packaged as attachments to uniquely identified e-mail messages.

A third aspect of the present invention concerns the use of TCP/IP (Transmission Control Protocol/Internet Protocol) for the transmission of messages in a Universal Messaging system. TCP/IP is a well known networking protocol that provides communications across interconnected networks and between computers with diverse hardware architectures and operating system. TCP is a connection-oriented protocol. It first establishes a connection between the two systems that intend to exchange data. When an application sends a message to TCP for transmission, TCP breaks the message into packets and sends them over the network. Because a single message is often broken into many packets, TCP marks these packets with sequence numbers before sending them. The sequence numbers allow the receiving system to properly reassemble the packets into the original message. The IP subset of TCP/IP is the messenger protocol that addresses and sends packets. TCP/IP divides networking functionality into the following four layers: (1) a Network Interface Layer that corresponds to the OSI Physical and Data Link Layers; (2) an Internet Layer that corresponds to the OSI network layer; (3) a Transport Layer, which corresponds to the OSI Transport Layer; and (4) an Application Layer corresponding to the session, presentation and application layers of the OSI model. The Application Layer manages the functions required by user programs, including protocols for remote log-in (Telnet), file transfer (FTP) and electronic mail (SMTP).

The third aspect of the present invention addresses the need for improved speed in transferring large data objects in a Universal Messaging system. Particularly, the problem is that data passing through the CMC interface, session management, and TCP/IP stacks of a Universal Messaging system necessarily cross a number of software process boundaries with substantial overhead. For example, having to cross at least two TCP/IP stacks (such as, e.g., in the system described below, in communicating messages from messaging platform 10 to server complex (Web platform) 12 and from server complex 12 to PC Client 20) adds significant overhead alone. While this may not be a problem for smaller files, such as e-mail messages and control information, it can be a significant problem for larger data objects, such as audio, graphics (fax images), and video. The overhead and protocols that the data must traverse can be too great to deliver such large data objects to the subscriber efficiently. The present invention addresses this problem as well.

Further background information concerning the construction and operation of messaging systems, and particularly one employing a Network Applications Platform (NAP) for interfacing a telephone network and network applications running on an enterprise server, may be found in: U.S. Pat. No. 5,133,004, Jul. 21, 1992, "Digital Computer Platform for Supporting Telephone Network Applications"; U.S. Pat. No. 5,138,710, Aug. 11, 1992, "Apparatus and Method for Providing Recoverability in Mass Storage Data Base Systems Without Audit Trail Mechanisms"; U.S. Pat. No. 5,384,829, Jan. 24, 1995, "Digital Computer Platform for Supporting Telephone Network Applications"; U.S. Pat. No. 5,323,450, Jun. 21, 1994, "Telephone Network Applications Platform for Supporting Facsimile Applications"; U.S. Pat. No. 5,494,606, Feb. 20, 1996, "Multi-Lingual Prompt Management System for a Network Applications Platform"; U.S. Pat. No. 5,633,916, May 27, 1997, "Universal Messaging Service Using Single Voice Grade Telephone Line Within a Client/Server Architecture"; U.S. patent application Ser. No. 08/944,924, filed Oct. 6, 1997, "Enhanced Multi-Lingual Prompt Management in a Voice Messaging System With Support for Speech Recognition"; U.S. patent application Ser. No. 08/964,744, filed Nov. 5, 1997, "Methods and Apparatus for Providing External Access to Executable Call Flows of a Network Application"; U.S. patent application Ser. No. 08/987,571, filed De. 11, 1997, "Multiple Language Electronic Mail Notification of Received Voice and/or Fax Messages"; and U.S. patent application Ser. No. 09/094,026, filed on even date herewith, "System and Method for Integrating Notification Functions of Two Messaging Systems in a Universal Messaging Solution".

SUMMARY OF THE INVENTION

The present invention provides Universal Messaging services to subscribers that may utilize the Internet to access their messages. The invention integrates an e-mail messaging system with a voice/fax messaging system on a messaging platform computer. E-mail messages are stored in an e-mail message store, and voice and/or fax messages are stored in a separate store controlled, e.g., by a Voice Mail Message Manager (VMMM). Subscribers can access messages from a personal computer via the Internet using a standard Web browser with a Java applet that present each subscriber with a "universal inbox" that displays all of that subscriber's voice, fax, and e-mail messages. A Web platform controls the Web browser interface to the messaging platform, accepting requests from the Web browser (such as a request to read an e-mail or listen to a voice mail) and passing prescribed types of information back to the Web browser. The Web platform interfaces with the messaging platform via a generic TCP/IP interface/router. A Session Manager application manages the Web browser's "session" with the messaging system. A CMC layer in the messaging platform provides the "glue" to enable communication and control between and among the different message stores. The CMC layer provides an industry standard mechanism for providing a standard API through which access to proprietary message stores can be made.

Thus, a Universal Messaging system in accordance with the present invention comprises a messaging platform supporting an e-mail messaging system and a voice/fax messaging system, wherein messages stored by the e-mail and voice/fax messaging systems are accessible to a remote Web-based client employing a Web browser interface via a wide area communications network coupled to the messaging platform through a session based interface; and session manager means supported by the messaging platform for initiating and maintaining a session between the messaging platform and the Web-based client(s).

In one presently preferred embodiment of the invention, the messaging platform comprises a Common Messaging Calls (CMC) layer, an e-mail message store and a voice/fax message store. According to a preferred implementation of the invention, when the Web-based client first requests access to voice, fax or e-mail message services via the Web browser, the user is required to enter a mail profile identifier and password, and then the session manager means establishes a session with the CMC layer of the messaging platform and associates a session ID with the session, and then the session manager means saves the profile identifier, password and session ID in a session record. Subsequent requests from the Web browser interface are automatically accompanied by the user's mail profile identifier, password and session ID.

In the preferred embodiment just mentioned, the session manager means attempts to validate each client request against the session record to verify that the user requesting service is already logged in; and a new CMC session is established if the session manager means cannot locate the identifier/password combination in the session record. Moreover, the session manager means automatically logs a user off the CMC layer, deleting the user's session record, if no activity is detected within a predetermined period of time.

Accordingly, the present invention provides a way to make a Universal Messaging system having a session-based interface compatible with a "sessionless" Web browser interface. This is particularly advantageous in a large messaging system since it avoids the need for a separate "log on" procedure for each HTTP request by the Web-based client. Thus, for example, the messaging system would not have to rebuild the user's "inbox" every time an HTTP request were sent to the messaging system.

Other features and advantages of the present invention are described below.

DETAILED DESCRIPTION OF PREFERRED EMBODIMENTS

A. Overview

Figure 1:
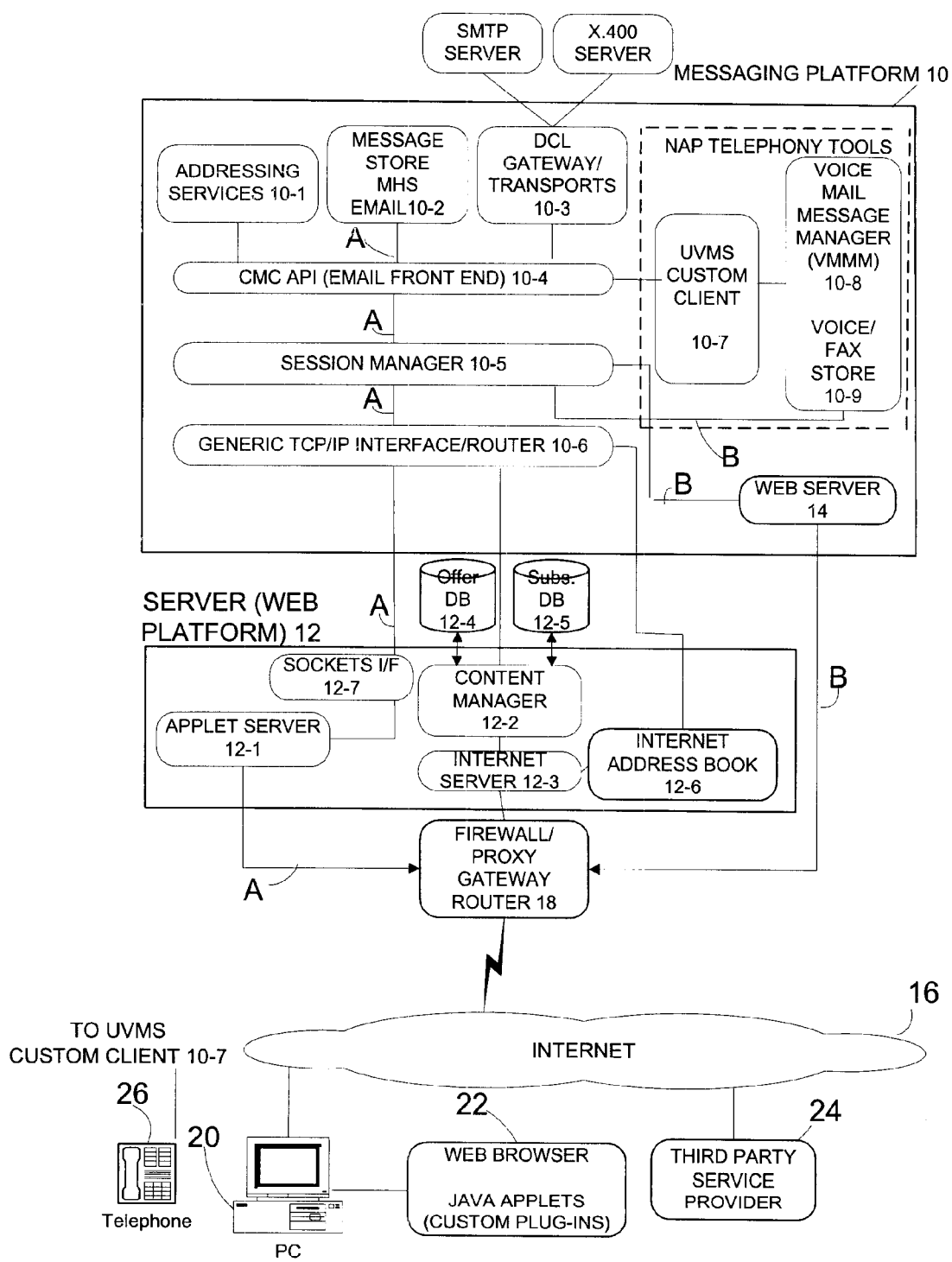
FIG. 1 schematically depicts one preferred embodiment of a Universal Messaging system in accordance with the present invention.

FIG. 1 schematically depicts one presently preferred embodiment of a Universal Messaging system in accordance with the present invention. As shown, the system includes a messaging platform 10 (e.g., Unisys Corporation's Clearpath NX™ mainframe computer); a server complex 12 (e.g., an NT server), also referred to herein as a "Web platform"; a "Web server" 14 (e.g., Unisys's Atlas™ software), which is sometimes referred to herein as a "large object server" and which is preferably a software component running on the messaging platform/mainframe 10 (i.e., it need not be a separate hardware component); a wide area communications network (such as the Internet) 16; a gateway/firewall 18; and a Web-based client comprising a remote PC-based client 20 and an associated Web browser 22. (As used herein, the term "PC" refers generically to a personal computer or like screen based client, and is not restricted any particular platform.) A third party service provider 24 may also be considered part of the overall system. The structure and operation of each of these components is explained below in connection with the detailed description of preferred embodiments.

As shown in FIG. 1, the messaging platform 10 includes the following elements: addressing services object 10-1; message store for e-mail 10-2; transports service provider 10-3 (including a gateway for interfacing to SMTP and X.400 servers); Common Messaging Calls (CMC) application programming interface (API) layer 10-4; Session Manager 10-5; generic TCP/IP interface/router 10-6; Universal Voice Messaging System Custom Client 10-7 and Voice Mail Message Manager (VMMM) (for voice and fax mail) 10-8; and voice/fax store 10-9. (Note that CMC the CMC standard is defined by the X.400 API Association. CMC 1.0 defines a basic set of calls to inject and extract messages and files, and to access address information. CMC's major "competition" is MAPI—Messaging Application Programming Interface, though simple MAPI is almost identical to CMC.)

The Web platform 12 includes an applet server 12-1 (e.g., for providing Java applets to the Web-based client); a Content Manager Application 12-2 (i.e., an application designed to receive information from content providers, format information into multimedia containers and distribute these containers to the Universal Messaging system via CMC calls); and an NT based Internet server 12-3, such as, e.g., an IIS server. (IIS is Microsoft Windows NT's Internet Information Server. IIS permits one to set up a Web site and control and manage it remotely through the Internet.) Web platform 12 also includes or is operatively coupled to a first database (Offer Database) 12-4 and a second database (Subscription Database) 12-5, where "offer" refers to an e-mail based advertisement and "subscription" refers to "news" from a content provider. In addition, Web server 12 includes a communications object/address book 12-6 and a Sockets Interface 12-7.

Figure 4A:
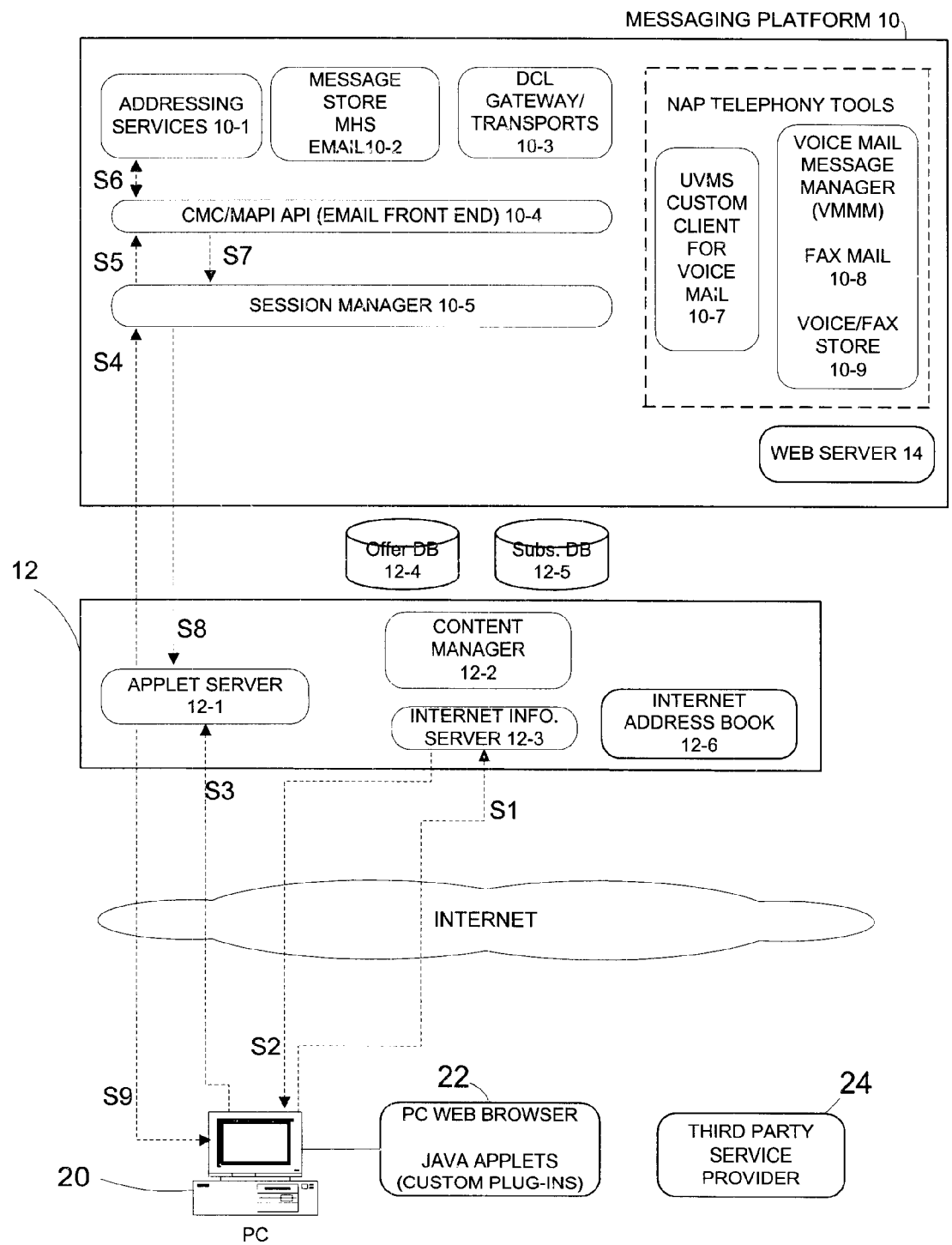
FIGS. 4A through 4K depict exemplary process flows for various transactions.
Figure 4B:
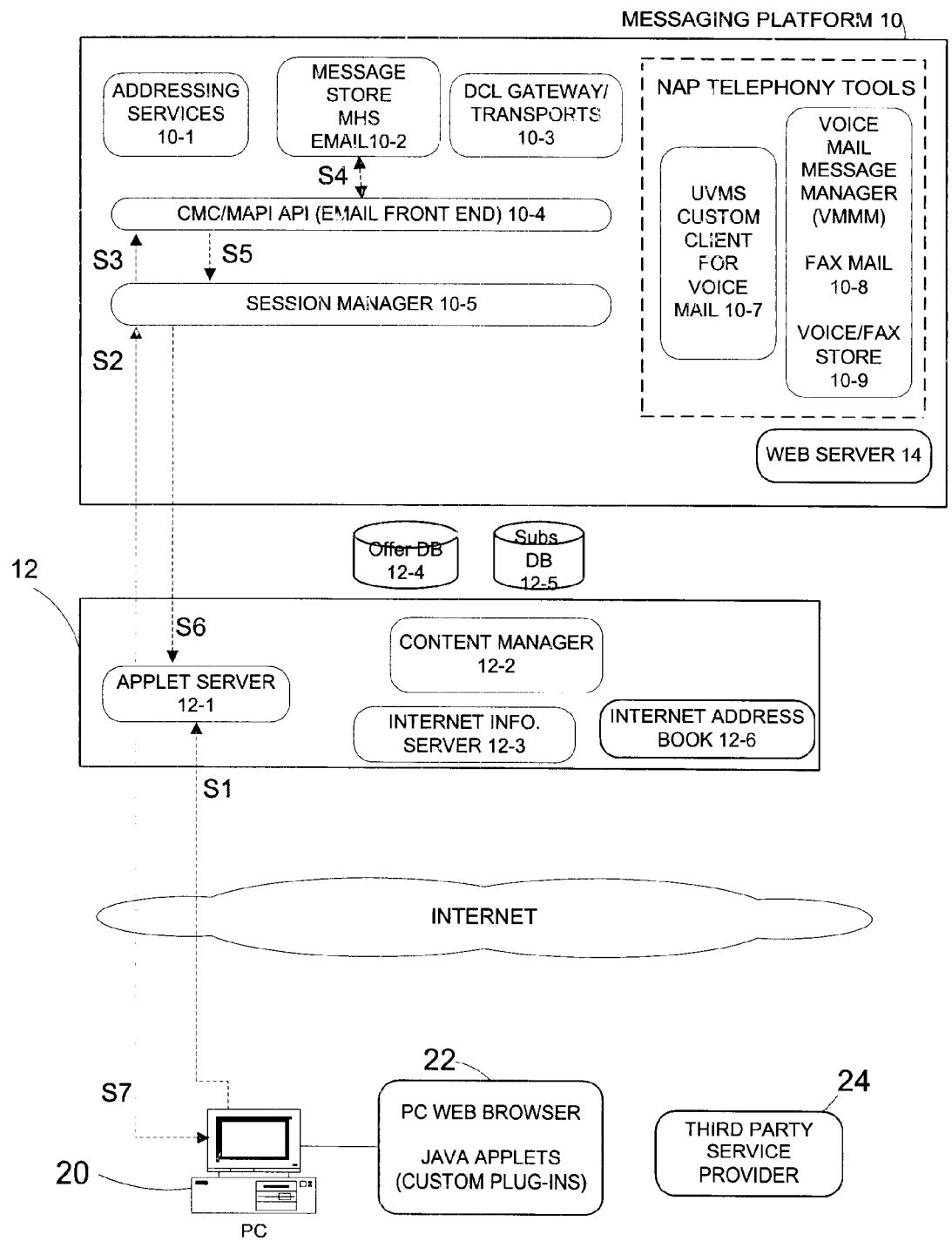
Figure 4C:
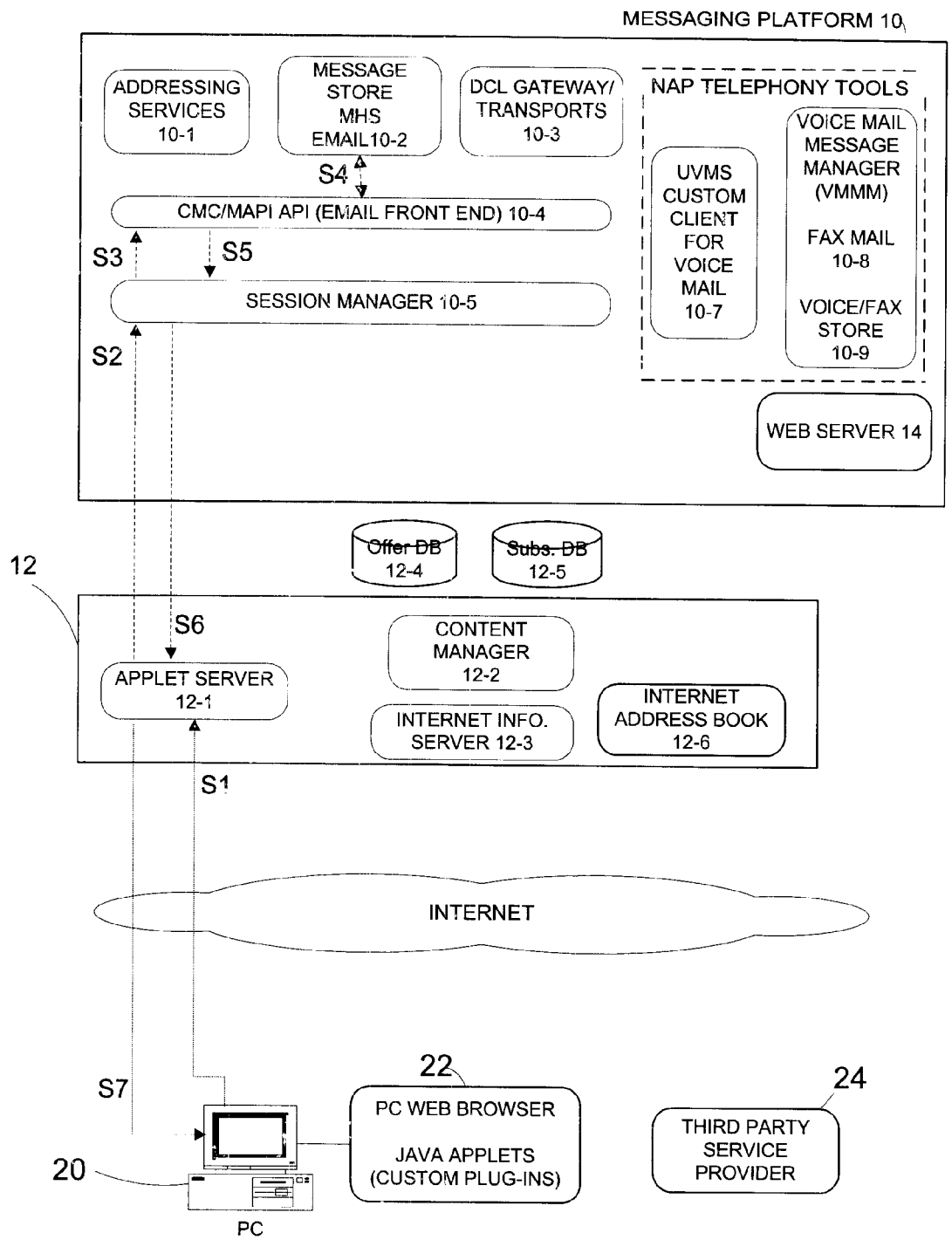

As shown, the firewall/gateway 18 interfaces the applet server 12-1, Internet server 12-3 and Web server 14 to the Internet 16. Moreover, the applet server 12-1 is responsible for downloading and interface with the Universal Messaging desktop located on the client's Web browser 22. The applet server downloads (to the client PC 20) the Java applets required to provide an active desktop, and then communicates with the applets to provide the look and feel of the messaging desktop. FIGS. 4A, 4B and 4C (discussed below) show exemplary flows for logon and messaging.

The CMC API layer 10-4 and its supporting components provides a messaging interface library. The present invention does not require the use of any specific messaging interface library.

As mentioned, the present invention provides methods and apparatus for use in a session-based messaging system to manage sessions initiated through a sessionless interface. This aspect of the present invention is described in detail below in connection with the discussion of the Session Manager 10-5, which is responsible for maintaining a "session" between the Web client 20 and the CMC API 10-4 even though the session is connectionless. For example, the Session Manager preferably retains a session record for each logged-on user to obviate the need for a CMC logon for each and every service request.

Another aspect of the present invention concerns an inventive method and apparatus for controlling access to different types of content in a messaging system. The present invention permits the use of existing Universal Messaging platform capabilities to address, store, transport, and deliver multimedia content packaged as attachments to uniquely identified e-mail messages. These specialized multimedia "containers" can be operated on by custom messaging clients in the same way as normal e-mail, and custom clients can be created to manipulate and present the contents of the containers in any way desired. A "custom client" is a Web-based messaging client that is custom built to manage and display multimedia containers. A "multimedia container" is a specifically designed type of message to store various kinds of multimedia information. Such a container may be filled by the Content Manager Application 12-2 (FIG. 1), distributed by the messaging system and displayed by a custom client. This aspect of the present invention is described below in connection with the discussion of the Content Manager 12-2.

In addition, the Web-based client 20 is permitted to access "small" messages, such as e-mail messages stored in message store 10-2, via the Internet 16. Such messages traverse the path denoted "A" in FIG. 1. The Web-based client 20 is permitted to access "large" objects, such as fax mail and voice mail messages stored in the voice/fax store 10-9, via the Internet and the path denoted "B". As explained below, Web platform 12 is "optimized" to handle the relatively smaller e-mail messages whereas Web server 14 is optimized to handle the relatively larger voice and fax mail messages. Such optimization is deemed necessary and advantageous in view of the relatively complex protocols, or large overhead, required by the TCP/IP interface/router 10-6. In accordance with another aspect of the present invention, such large overhead is avoided with respect to the relatively larger voice/fax message objects, where it is most problematic, by transmitting messages directly from the voice/fax store 10-9 through Session Manager 10-5 and then through Web server 14, thus bypassing the TCP/IP interface/router 10-6 employed to pass messages between the messaging platform 10 and the Web platform (NT server) 112.

B. Session Manager

Messaging systems, such as the UVMS system shown in FIG. 1, are typically session-based. That is, a user enters his/her user code and password and is logged into a session. If the session is terminated for any reason, the user must log back in. The CMC API 10-4 is also session-based in that user access to messages via the CMC requires a log-on procedure to be performed. In contrast, the Internet is sessionless. Specifically, the Internet, and the World Wide Web in particular, is based on a request/response paradigm that uses the HTTP protocol. When a Web browser (such as browser 22) "connects" to a "page" of the Web, no actual session is created. All that occurs is that the browser issues an HTTP request to the Web server (such as server 12) that hosts that page, and the Web server transfers the HTML code comprising the page to the browser—no connection is maintained between separate user requests. Any subsequent accesses to that Web page or to links within that page are performed using another HTTP request/response which requires another connection.

Since the primary client interface, the CMC layer 10-4, to Universal Messaging is session based, it is advantageous to provide some way to initiate and maintain a session for the Web browser client. The primary advantage is that during a session for a client, the CMC layer 10-4 maintains various user and messaging data. This data is lost when a session is terminated. The Web browser interface to the Universal Messaging system could follow the usual request/response paradigm of the World Wide Web, however, it would be highly inefficient to do so because each request would require a logon-request-logoff sequence. Therefore, it is the function of the Session Manager 10-5 to establish and maintain sessions on behalf of the Web browser client.

For example, when a user first requests access to voice, fax, or e-mail message services (such as reading or sending messages) via the Web browser interface 22, the user is required to enter a mail profile identifier (e.g., a user name) and password. The Session Manager 10-5 then establishes a session with the CMC layer 10-4 on behalf of the user and associates a session ID with the session. The Session Manager saves the profile identifier, password, and session in a session record.

Every subsequent request from the Web browser interface 22 is automatically accompanied by the user's mail profile identifier, password and session ID, although the user is not made aware of this. The Session Manager 10-5 attempts to validate each such call against the session records to verify that the user requesting service is already logged in. A new CMC session will be established if the Session Manager 10-5 cannot locate the identifier/password combination in its session log.

A timeout function of the Session Manager 10-5 automatically logs a user off the CMC layer 10-4, deleting his/her session record, if no activity is detected within a predetermined period of time.

Session Manager Implementation Details

The presently preferred functions performed by the Session Manager 10-5 include:

Associating requests originating in the network, which are forwarded by the router 10-6 with the Universal mailbox;

Instituting a timeout process for these sessions;

Converting message-based Web extension calls to procedural CMC calls and UM service library calls, and converting any responses to these calls to a response message format; and Constructing session-related URLs and embedding them in responses to the Web server 14.

These and other aspects of the Session Manager 10-5 are described below in connection with the following topics:

a. Relationship to other entities
b. Memory management
c. Session establishment
d. Library entry points
e. Mapping Remote Interface messages to the CMC API
f. Router Interface
g. Web Server Interface
h. Debugging options a. Entity Relationships The Session Manager 10-5 is implemented as a server library whose primary clients are the applet server 12-1 and Content Manager 12-2 running on one or more Internet servers 12-3 and interfacing via the Router 10-6, and Web Server 14. In turn, the Session Manager links to the CMC layer 10-4 using a single connection.

Also linked to by the Session Manager 10-5 are UVMS 10-7 and Voice Mail Message Manager (VMMM) 10-8. The Session Manager 10-5 is also linked to the Web server 14.

The services provided by the CMC layer 10-4 can be considered low-level when compared with the requirements of the Web client 20. The Session Manager 10-5 typically converts each client request into multiple calls on the CMC layer 10-4. For example, the client may request a list of message headers to present to the user as the contents of an "inbox". The Session Manager 10-5 then has to call the CMC layer 10-4 to construct a summary structure. Additional calls are made for each member of the summary structure to extract the required information, such as sender, subject, priority, date/time; etc. This data is consolidated by the Session Manager 10-5 and returned to the client in a convenient form. Most e-mail functions (e.g. read, send) result in multiple calls on the CMC layer 10-4.

Parameters are passed to the Session Manager 10-5 in message form using an XDR format (a format whereby integers are represented by a four byte binary value with the most significant bit representing the sign). The Session Manager 10-5 decodes these parameters so they are compatible with CMC requirements.

The Session Manager 10-5 is also responsible for checking the result of each CMC function and returns an appropriate result code to its client.

b. Memory Management

The router 10-6 allocates the arrays needed to pass requests to and receive data from the Session Manager 10-5. Within the Session Manager 10-5 there will be a pool of arrays used for temporary storage. The Session Manager 10-5 often needs to use more than one work area to service any given request. This approach should minimize the swapping of arrays in and out of memory on the mainframe 10.

Two procedures, AllocateBuffer and FreeBuffer, control the allocation and deallocation of work areas. The procedure "AllocateBuffer" returns the index of an array row in a two-dimensional word array for the caller to use for temporary storage. The "FreeBuffer" procedure returns the designated array row to the available pool. Procedures requesting buffers should include an exception procedure to free the buffers to ensure that rows are not "lost" following a program fault.

c. Session Establishment

As discussed above, the Session Manager 10-5 is responsible for maintaining a session between the Web client 20 and the CMC layer 10-4 even though the session is connectionless. Every request for service from the Router 10-6 will include the user's mail profile identifier and password. The user's profile ID will be unique. Initially required for session establishment and the creation of a session record, the profile and password included in each request permits the Session Manager 10-5 to validate that each request pertains to an existing session. Where no matching session is located the Session Manager 10-5 automatically creates a new session on behalf of the user. This feature will also facilitate the future "hot" replacement capability of the library when it is fully implemented. The session record also stores the session number provided by the CMC during logon and this is used in subsequent CMC calls to uniquely identify the user session.

d. Library Entry Points

The Session Manager 10-5 provides two critical entry-points. The first is provided specifically for the use of the Router 10-6 and allows its users (applet server 12-1 and content manager 12-2) to request various functions of the Session Manager 10-5 by passing parameters and receiving results in a message-based format.

The entry point for the router 10-6 is defined as:

```
Real Procedure Request (InRequest, Len, Response, Scratch, Flags);
Value InRequest, Response, Flags;
Pointer InRequest, Response;
Real Len, Flags;
Array Scratch [0];
```

"InRequest" and "Response" are pointers to arrays allocated in the remote interface. "Scratch" is an array allocated by the Router 10-6 and passed to the Session Manager 10-5 to use as a work area.

A second entry point exists for the use of the Web Server 14 and is declared as:
Integer Procedure CGI_Session_Manager (req, content_length, receive, send, getenv, getargv, malloc, free, heaptoptr);
  VALUE
    req, content_length
  INTEGER
    req, content_length;
  INTEGER PROCEDURE receive (len, req);
    VALUE req, len;
    INTEGER req, len;
    FORMAL;
  INTEGER PROCEDURE send (buf_ptr, len, req);
    VALUE buf_ptr, len, req;
    INTEGER buf_ptr, len, req;
    FORMAL;
  INTEGER PROCEDURE getenv (env_ptr);
    VALUE env_ptr;
    INTEGER env_ptr;
    FORMAL;
  INTEGER PROCEDURE getargv (arg_no);
    VALUE arg_no;
    INTEGER arg_no;
    FORMAL;
  INTEGER PROCEDURE malloc (bytes);
    VALUE bytes;
    INTEGER bytes;
    FORMAL;
  INTEGER PROCEDURE free (cptr);
    VALUE cptr;
    INTEGER cptr;
    FORMAL;
  INTEGER PROCEDURE heaptoptr (cptr, aptr);
    VALUE cptr;
    INTEGER cptr;
    POINTER aptr;
    FORMAL;

e. Mapping Remote Interface Messages to CMC API

The applet Server 12-1 and Content Manager 12-2 calls the Session Manager 10-5 using the "Request" entry point. The primary key for the message is the session ID. This is the end to end communication key between the Web client 22 and the Session Manager 10-5 and is composed of the user ID and password. On receipt of a message from the Router 10-6, the Session Manager 10-5 derives the session ID and determines whether or not it identifies a valid session. If not, the Session Manager 10-5 attempts to log the user onto the CMC layer 10-4 and establishes a local session record. The requested function is then performed.

The structure of the request message passed to the Session Manager 10-5 is outlined below:

| FunctionID | |
|---|---|
| User ID | Long Integer |
| User Password | String |
| | String |
| <Set of positional parameters based on FunctionID> | |

A structure of the response message returned from the Session Manager 10-5 is:

| Msg format indicator | |
|---|---|
| User ID | Long Integer |
| Password | String |
| ResultCode | String |
| | Long Integer |
| <Function-specific data> | |

The above style of messaging allows for easy expansion of messages in the future while keeping network overheads to a minimum.

Only two basic types of parameter are permitted: An integer represented as a 4-byte hi-endian number; and "String" starting with a integer length followed by length bytes of ASCII data. A structure can be constructed out of the above two basic elementary types. A structure may take the form of <collection of elementary type>. A constructed parameter called "array" is also available. The form of "array" is <count of elements> <collection of elements>, where <count of elements> is a long integer and <collection of elements> is a collection of fixed length structures.

f. Router Interface

The functions available to clients calling the Session Manager via the router interface are listed below.

Logon (FunctionID=1): Logs the user on to the CMC layer 10-4 and creates a session record within the Session Manager 10-5.

Logoff (FunctionID=2): Logs the user off the CMC layer 10-4 and destroys the Session Manager session record.

GetAllHeaders (FunctionID=3): This is the first example of the Session Manager providing additional intelligence by performing a number of CMC functions in response to a single request. The Session Manager 10-5 obtains the headers for all subscription records for the user by requesting all headers of a particular (content) BLT type, sorts them by subject field and ascending date/time, and then deletes all but the latest message where the subject fields are identical so that only the latest record for a given subscription remains. Next, all headers are requested and returned to the requester. An appropriate result value is returned. The Session Manager 10-5 returns the read/unread status of each message as well as an indication of the presence of attachments. CMC functions called include: CMC_Act_On, CMC_List, Clear_Extension, Set_Extension, Get_Summary, Get_Summary_Recipient, Get_Summgry_Extension, and Get_Display_Time.

GetNewHeaders (FunctionID=4): Having called GetAllHeaders, the client is expected to save the 128-bit reference of the last header received (assuming it did receive one or more headers). The client will periodically refresh its list of headers by calling this function passing the last received message reference. The Session Manager 10-5 will request all messages with a greater reference from the CMC layer 10-4 and process these in exactly the same way as the GetAllHeaders function.

SendMessage (FunctionID=5): Parameters are numerous and include such items as to, cc, bcc, subject, priority, message text, attachments, etc. An additional parameter determines whether or not the message is sent to the designated recipient(s) as well as being "saved" by sending the message to the originator with a specific BLT message type that allows foldering emulation. CMC functions called include, CMC_Send, Clear_Message, Set_Message, Set_Message_Recipient, Set_Message_Attach, and Get_Message. This function preferably involves the implementation of BCC recipients within the CMC layer 10-4.

ReadMessage (FunctionID=6): The Session Manager 10-5 obtains the message referenced by the single 128-bit string parameter and returns the message header fields, the message body and details of attachments to the caller. Reading a message will cause the message to be marked as read. CMC functions called include CMC_Read, Clear_Extension, Set_Extension, Get_Message, Get_Message_Ext, Get_Message_Recipient, and Get_Message_Attach. BCC recipients are implemented within the CMC layer 10-4.

DeleteMessage (FunctionID=7): The Session Manager 10-5 will delete the message referenced by the single 128-bit string parameter. The CMC function called is CMC_Act_On.

ValidUser (FunctionID=8): Content Manager 12-2 calls this function to determine whether or not the supplied mail profile ID represents a registered user. If so, a lookup is performed to get the user's full name and SMTP address. The Session Manager 10-5 also determines if a current session exists for the specified user.

GetAttachment (FunctionID=9): Parameters are (1) the 128-bit message identifier and (2) the relative attachment number. The Session Manager 10-5 determines the name of the attachment file, locates it and returns the file contents to the caller. The CMC layer 10-4 function called is Get_Message_Attach.

CreateOfferMessage (FunctionID=10): The Content Manager 12-2 calls this function to send a message to a list of recipients. The message text provides details of the offer and an attached URL points to the content being offered. The CMC functions called include, CMC_Send, Clear_Message, Set_Message, Set_Message_Recipient, Set_Message_Attach, and Get_Message.

CreateSubscriptionMessage (FunctionID=11): Similar to the previous function except there is no message text or return address. A URL points to the content. The CMC layer (10-4) functions called are the same as SendMessage.

GetVoiceFaxInfo (FunctionID=12): Having previously called ReadMessage and obtained an encrypted reference to a voice or fax message, the client next calls this function to obtain information relating to the voice/fax message. The Session Manager has to read the e-mail notification message to obtain a reference to the UVMS 10-7 message and information about the voice/fax message. One or more encrypted references to VMMM 10-8 messages are returned to the caller to be used by the Web Plugin to retrieve voice or fax data via the Web Server 14. Each encrypted message reference includes a timestamp so they have a limited lifetime. The CMC layer 10-4 functions called are the same as SendMessage.

GetHeaderCount (FunctionID=13): This function returns the total count of messages in the user's mailbox and is used by the client to allocate appropriate resources.

ChangeProperty (FunctionID=14): This function allows the user to change user properties. The function is passed a name/value pair. Only one property can be changed per call. Currently the user may only change his or her CMC password. The CMC layer 10-4 function called is CMC_Password.

g. Web Server Interface

Streaming of voice and fax data both into and out of the VMMM Voice/Fax Store 10-9 is accomplished with the Web Server 14 which calls Session Manager 10-5 as a CGI library using the CGI_Session_Manager entry point. Two procedures, one for input and one for output, handle all streaming requirements.

The Session Manager's CGI interface has two responsibilities. Firstly, given an encrypted reference to a voice or fax message by the Web Plugin it must be able to locate the actual data and stream it back to the plugin to be "played" to the user. Secondly, it must be able to accept a data stream recorded by the plugin and representing a voice or fax message and process it appropriately.

When the Session Manager CGI interface receives a request it calls a procedure Stream_Voice_Fax_Data which extracts the encrypted VMMM message reference (previously obtained via a ReadMessage function call) from the incoming request. The reference is decoded and the timestamp checked for expiration. If the reference has not expired, the procedure GetVMMMBlob is called in the VMMM 10-8 interface library to stream the data back to the plugin via the Web Server.

After recording a voice message, the plugin streams data to the Session Manager which invokes a procedure called Accept_Voice_Fax. The Session Manager then calls the VMMM 10-8 interface library to store the data. The mailbox is checked and UVMS 10-7 is called to compose the message. After processing all the recipients an e-mail is generated (if one or more recipients failed) and sent to the originator to notify him or her of a problem. Finally, the user's browser is redirected to one of the two URLs supplied by the plugin to indicate the operation is complete and has succeeded or failed.

h. Debugging Options

Various debugging data including a trace of all data entering and leaving the Session Manager 10-5 is written to an optional trace file. The trace file is written in a comma-separated stream file format that is compatible with Microsoft Excel and other similar products.

Debugging can be initiated when the Session Manager 10-5 starts or during runtime. A new trace file is created each time tracing is initiated.

C. Content Manager

As mentioned above, another aspect of the present invention concerns an inventive method and apparatus for controlling access to different types of content in a messaging system. The approach described herein permits the use of existing Universal Messaging platform capabilities to address, store, transport, and deliver multimedia content packaged as attachments to uniquely identified e-mail messages. These specialized multimedia "containers" can be operated on by custom messaging clients in the same way as normal e-mail. Save, delete, reply, forward, and other common e-mail functions continue to operate as expected.

Customized clients can be created to manipulate and present the contents of the containers in any way desired. Some of the material referred to below can be found in the X.400 API Association's Common Messaging Call API Specification, Version 2.0, dated Jun. 28, 1995.

The Content Manager 12-2 is employed to serve as an interface to content providers, organize the content into the proper formats for receiving clients, provide address lists for the content containers, and set other desired content message parameters, such as priority. In addition, the Content Manager 12-2 acts as a client when receiving e-mail based replies to certain types of content messages.

The presentation and manipulation of the content messages is the responsibility of the custom messaging client(s), such as UVMS custom client 10-7. The end user look and feel of these messages is completely under the control of the client. End user presentation issues such as displaying messages in separate folders, presenting custom icons for messages, enabling customized operations on messages or their contents is the responsibility of the client.

Content container messages preferably utilize the standard e-mail header constructs common to all messages. Standard headers contain "To:", "From:", "cc:", and "Subject:" fields as well as various flags for priority, return receipt, and other message status and delivery options. The "To:" and "From:" fields are filled in by the Content Manager 12-2. The "To:" field will contain a list of all users targeted to receive a particular subscription or offer. The "From:" field will most likely contain the e-mail address of an inbox assigned to the Content Manager 12-2; however, this is not a requirement and any "From:" address could be used.

Platform Services

A standard set of message maintenance and housekeeping functions are supplied by the Universal Messaging platform 10. Mailbox attributes such as message count and size limits are supported. Attributes that apply to individual messages, such as delivery priority, return receipt, and expiration, are also handled by the platform. The concept of expiration of messages is especially important when using content delivery messages. The Content Manager 12-2 sets the message expiration attributes in the content message headers to ensure that outdated offers and subscriptions are automatically removed from the system.

The Universal Messaging platform 10 also ensures that the current state of all messages (including content containers) is accurately reflected no matter which access device is used. For example, if an offer is opened and saved at the handset 26, the saved state of the offer is reflected in the users universal inbox. If the user then logs into the system using the Web interface, the custom Web application (e.g., browser 22) can use the inbox information to display the offer header on the screen in a manner different from new offers. Other message operations (such as delete) are reflected in the universal inbox. Prohibiting or enabling certain operations on a message type or user basis (such as the deletion of subscription containers) is a custom client function.

Messaging Enabled Applications

The Content Manager 12-2 is preferably implemented as a messaging enabled application that is responsible for the generation and maintenance of the content messages flowing in and out of the Universal Messaging system. The Content Manager 12-2 has access to the Universal Messaging platform via CMC 1.0 client calls, VNMS support library calls, and the messaging platform file system.

The Universal Voice Messaging System (UVMS) 10-7 is also considered a messaging enabled application. UVMS handles client interface functions for the telephone handset user. All audio and fax content delivery functions involving an interface to telephone devices and fax machines are managed by the UVMS call flows.

The Web server 14 shown in FIG. 1 can either be a Unisys Clearpath™ based Atlas™ server (such as a server supplied with Umsg Release 1.0) or any other Web server to which the Content Manager 12-2 and custom Web application have access. The Web server 14 does not have access to the Content Manager 12-2. The sole purpose of the Web server 14 is to fulfill requests from the Web-based client 22 for the retrieval and delivery of voice and fax messages. Client requests bound for the Content Manager are handled by the Internet Information Server 12-3.

Content Container

Figure 2:
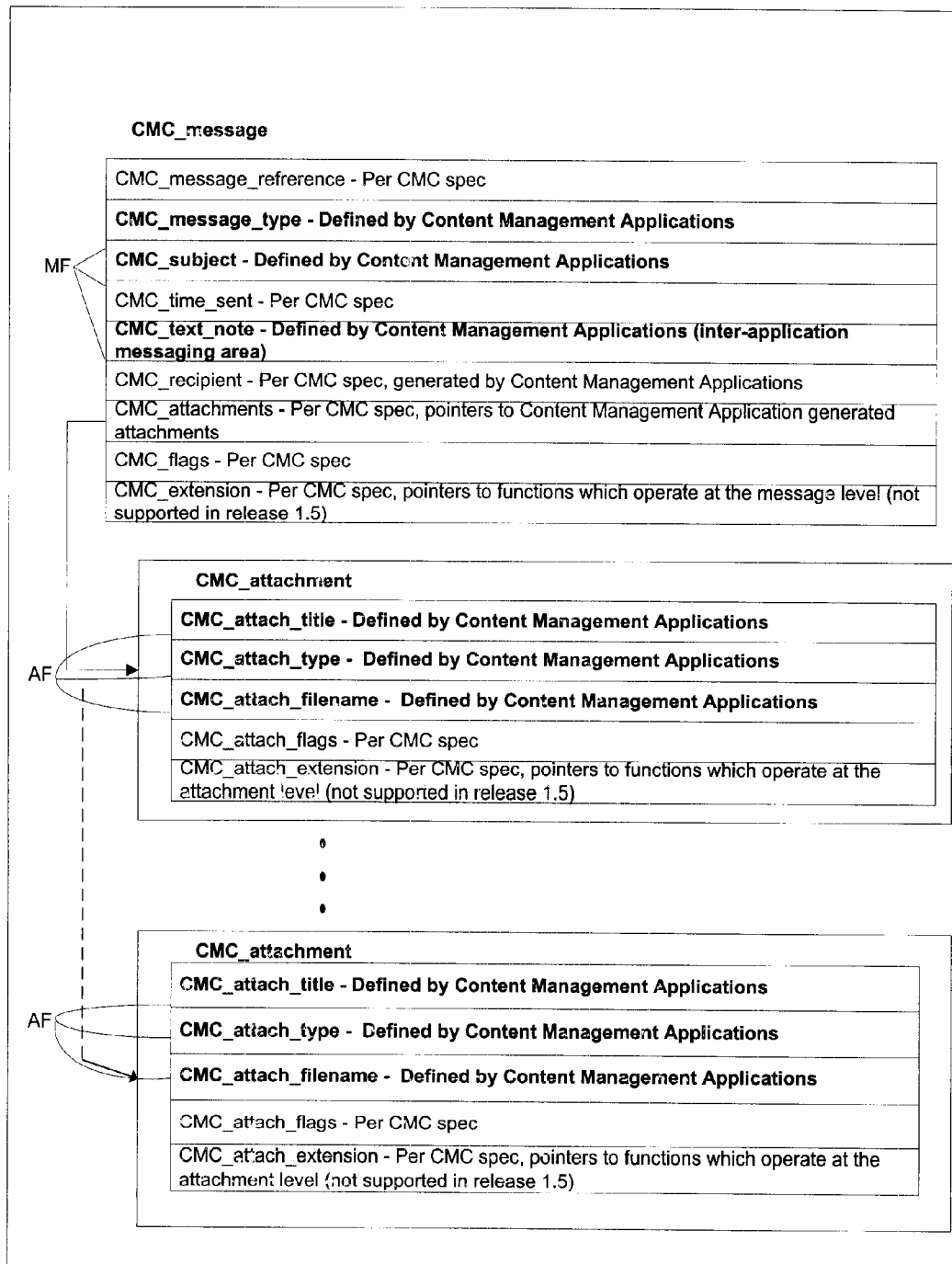
FIG. 2 depicts an exemplary multimedia container in accordance with the present invention.

FIG. 2 illustrates an exemplary multimedia container format. Message and attachment fields shown in bold, and indicated by reference characters "MF" and "AF", are defined by the Content Manager 12-2 and multimedia clients. The content of fields not in bold are defined by the CMC specification, and these fields are filled by applications in accordance with the specification.

The tasks involved in designing the container are as follows:

1. Develop a list of agreed upon message type definitions. The definitions should be sufficiently flexible to allow expansion in the future.
2. Define the use of the subject field.
3. Define a structure for the text—note field. We propose that the text—note field be used for communication between the Content Manager 12-2 and the multimedia clients.
4. Agree on the use of attachments. We propose that all content is carried in attachments via a pointer in the filename field. Only one type of content (e.g., audio, text, HTML, graphic) should be used per attachment.
5. Define the use of the attachment field's title, type, and filename. Produce a standard for using filename to contain pointers to objects (such as a URL).

The following sections describe each component of the CMC message structure depicted in FIG. 2 in more detail.

Message Types

As mentioned, the Universal Messaging platform may be enhanced to provide support for a new series of message types specifically targeted for the delivery of multimedia content. These message types will be ignored by normal e-mail clients but will be visible to the CMC layer 10-4 clients specifically coded to recognize the message type.

The following message types are defined in the CMC specification:
Object Identifiers type "OID", used for types identified by object identifiers as defined in CCITT Recommendation X.208.
CMC Registered Values type "CMC", used for types defined in the CMC 2.0 specification.
"CMC:IPM.Note" Interpersonal message. A memo-like message containing a recipient list, an optional subject, an optional text note, and zero or more attachments. The "Message" structure is optimized to accommodate a message of type IPM.

"CMC:Report.IPM.Note.IPRN" Receipt notification for an interpersonal message. A receipt notification indicates that a message has been read by the recipient.
"CMC:Report.IPM.Note.IPNRN" Non-receipt notification for an interpersonal message. A non-receipt notification indicates that a message has been removed from the recipient's mailbox without being read.
"CMC:Report.IPM.Note.DR" Delivery report indicating that the service was able to deliver a message to the recipient.
"CMC:Report.IPM.Note.NDR" Non-delivery report indicating that the service was not able to deliver a message to the recipient.
"CMC:Report.IPM.Note.CDR" Both delivery and non-delivery reports when the original message is destined for multiple recipients, indicating that the messaging service is able to deliver the message to some recipients but not to the others.
Bilateral Defined Values Type "BLT", used for types that are unregistered.

Because all message types other than CMC Registered Values are ignored by standard messaging clients, our choices are to use one of the defined object identifiers or to specify a new message type. The Universal Messaging platform has already declared message type "BLT:NAP" to be used to identify messages (currently voice and fax) that are handled by the UVMS messaging application. ("NAP" refers to Network Applications Platform.) Because the content delivery function does not seem to fit into any of the pre-declared message type categories, we suggest that one define a new message type class for the content containers. The message type takes the format: BLT:UMSCONTENT.<class>.<subclass> . . . <subclass>.

The hierarchy of the new message class for type "SUBSCRIPTION" is shown below:
"BLT:UMSCONTENT"
    "BLT:UMSCONTENT.SUBSCRIPTION"
        "BLT:UMSCONTENT.SUBSCRIPTION-.NEWSPAPER"
        "BLT:UMSCONTENT.SUBSCRIPTION.MAGAZINE"
        .
        .
        .
        "BLT:UMSCONTENT.SUBSCRIPTION.xxx"

Similar message classes may be defined for type "OFFER" and "BILL". The class types are determined by the types of content to be offered. Subclasses are used to differentiate between different formats of content within a class. Appropriate subclass extensions can be defined within each class as required. In a presently preferred embodiment of the invention, extensions can be defined as required up to the message type data item limit of 255 characters.

Message Structure

The following is an exemplary type definition for a CMC message structure shown in C language syntax. A similar structure definition is provided in the ALGOL CMC support library.

typedef struct {
        CMC_message_reference
        CMC_string
        CMC_string
        CMC_time
        CMC_string
        CMC_recipient
        CMC_attachment CMC_flags
        CMC_extension
        CMC_message;
        *message_reference;
        message_type;
        subject;
        time_sent;
        text_note;
        *recipients;
        *attachments;
        message_flags;
        *message_extensions;

A data value of this type is a message. This data structure is included to provide support for CMC 1.0 implementations. A message has the following components;

| | |
|---|---|
| message_reference | Identifies the message. The message reference is unique within a mailbox. |
| message_type | String that identifies the type of the message. |
| subject | Message's subject string. This is a free form string which can be used as desired by the content management application. |
| time sent | Date/time message was sent (submitted). |
| message_reference | Identifies the message. The message reference is unique within a mailbox. |
| text_note | Message's text note string. If the value is NULL, there is no text note. If the CMC_TEXT_NOTE_AS_FILE flag is set, the text note is in the first attachment. The format of the text note, regardless of whether it is passed in memory or in a file, is a sequence of paragraphs, with the appropriate line terminator for the platform (CR for Macintosh, LF for Unix, CR/LF for DOS and Windows, etc.) terminating each paragraph. Long lines (paragraphs) may be word wrapped by the CMC implementation. Note that there is no guaranteed fidelity (e.g., a long paragraph may be returned by the CMC read functions as a series of shorter paragraphs). |
| recipients | Pointer to first element in array of recipients of the message. |
| attachments | Pointer to first element in array of attachments for the message. |
| message_flags | Bits for Boolean attributes. Unused bits should be clear. |
| message_extensions | Pointer to first element in array of per-message extensions. |

Attachments

Multimedia content can be placed directly in the content messages by using the text_note field of the message structure. Content can also be referenced by a pointer using the attach_filename field of the attachment structure. The latter approach allows the actual content to be stored directly in the appropriate message store instead of being carried along with the message. An example of this would be placing the audio portion of a subscription directly into the VNMS object store and including a pointer to the audio (NAP message ID) in the content message. Clients accessing the message would request the audio content directly from the VNMS object store using the supplied pointer.

We suggest that the text-note field be used to carry instructions relating to presentation and management of the content, and the actual content be referenced by pointers using attachment structures. Each attachment will only carry one type of multimedia data. For example, a content container (message) carrying the content for a Wall Street Journal subscription would have three attachments. One attachment would carry ASCII text content, one would carry HTML content, and one would carry audio content. The receiving client would use the attachment format appropriate to the access device the client is servicing.

In CMC, attachment structures contain information about an attachment. This information includes a user defined attachment title, a predefined object identifier (standard or user defined), the attachment filename (which could also be a pointer such as a URL), flags that determine the final ownership of the attachment, and an extension structure that can contain pointers to functions that operate on attachments.

The following is a type definition for a CMC attachment structure shown in C language syntax. A similar structure definition is provided in the ALGOL CMC support library.

```
typedef struct {
        CNC_string          attach_title;
        CMC_object_identifier attach_type;
        CMC_string          attach_filename;
        CMC_flags           attach_flags;
        CMC_extension       *attach_extensions;
} CMC_attachment;
```

This data structure is fully supported in CMC 1.0 implementations. An attachment has the following components:

| | |
|---|---|
| attach_title | Optional title for attachment, e.g., original filename of attachment. This field is free format. It may be used to convey additional information about the attachment content. |
| attach_type | Object identifier that specifies type of attachment. A NULL value designates an undefined attachment type. Two general purpose Object Identifiers have been predefined for use by applications and CMC implementations. |
| attach_filename | Name of file where attachment content is located. The location of the file is implementation dependent, but should ensure access by the calling application. If the attach_type indicates a pointer based object identifier, the attach_filename will contain the pointer. |
| attach_flags | Flags boolean attributes. Unused flags should be clear. |
| attach_extensions | Pointer to first element in array of per-attachment extensions. A value of NULL indicates that no extensions are present. |

A listing of exemplary predefined object content types is provided in the appendix below.

Custom Client for Multimedia Containers

Standard messaging clients (e.g., such as Microsoft Exchange and Lotus Notes cc:Mail) are only capable of acting on messages where the message type field is IPM:xxxx, where "xxxx" could be Note, NDN, Report, etc. The multimedia container concept disclosed herein relies on a messaging client that has the capability to recognize message types other than IPM. In the case of the Universal Messaging system, the message type used for multimedia containers is "BLT:UMSCONTENT.<content_type>" (where BLT stands for bilateral defined type). A custom messaging client for multimedia containers must have the capability to both create and interpret CMC messages of type BLT:UMSCONTENT.

A client of this type can be constructed by starting with a basic CMC client architecture (as used in the Universal Messaging e-mail client) and adding additional logic to handle the extended range of type fields required for the multimedia containers. In the case of message creation, this logic would include a table of supported content types indexed by a value known to the content provider. Content that is delivered to the custom client (through electronic data transfer or other means) will contain an identifying value that the custom client will use as an index into the content type table. Content messages are constructed by creating a standard CMC message (as for an e-mail), addressing the message to the recipient of the content, placing the content (or pointer to the content) into the body of the message, and setting the message type attribute equal to the string "BLT:UMSCONTENT<content type from the table>". The message is then submitted to the CMC API for normal handling in the manner of a standard e-mail.

The messaging platform delivers the multimedia content message to the addressed recipient. The message is ignored if the recipient does not have a custom multimedia container client. The standard client does not display the message or attempt to perform any action on it.

A custom client capable of recognizing and acting on the multimedia content message requires a change to the standard messaging client's message header handling logic that will cause the client to recognize message types beginning with BLT:UMSCONTENT. Upon discovering a message of type BLT:UVMSCONTENT, the custom client proceeds to read the extended type information following the BLT:UVMSCONTENT string. This information is used to provide customized presentation and handling of the content embedded in the message body. The custom client must should logic to handle all of the types of content that can be transported in the multimedia content container.

D. Web Server for Large Objects

Another aspect of the present invention concerns an inventive method and apparatus for speeding the transfer of large data objects in a Universal Messaging system. The system of FIG. 1 integrates an e-mail messaging system with a voice/fax messaging system on the messaging platform 10. E-mail messages are stored in an e-mail message store 10-2 whereas voice and/or fax messages are stored in a separate storage area 10-9 controlled by the Voice Mail Message Manager (VMMM) 10-8. Subscribers can access messages from a personal computer 20, via the Internet 16, using a standard Web browser 22 with a proprietary Java applet(s) that presents the subscriber with a "universal inbox" that displays all of the subscriber's voice, fax, and e-mail messages. The Web platform 12 controls the Web browser interface to the messaging platform 10, accepting requests from the Web browser 22 (such as a request to read an e-mail or listen to a voice mail) and passing certain kinds of information back to the Web browser. The Web platform 12 interfaces with the messaging platform 10 via the generic TCP/IP interface/router 10-6. The Session Manager 10-5 manages the Web browser's "session" with the messaging system. The CMC layer 10-4 provides the "glue" to enable communication and control between the different message stores.

A problem that can arise in such a system is that data passing through the CMC layer 10-4, the Session Manager 10-5, and the TCP/IP stacks on both the messaging platform 10 and the Web platform 12 necessarily cross a number of software process boundaries with substantial overhead. Having to cross at least two TCP/IP stacks adds significant overhead alone. This data path is indicated by the reference character "A" in FIG. 1.

The presently preferred embodiment of the present invention solves this problem by sending large data objects via a separate, dedicated one-way Web server 14, thus minimizing the path traversed by the data on its way to the subscriber's Web browser 22. The request for that data, however, is still received via the Web platform 12. Because the Session Manager 10-5 has already validated the subscriber through his/her Web browser connection, the transfer of a large data object does not require separate validation. The system simply sends the data through the dedicated server 14 to the subscriber's URL. This architecture allows the Web platform 12 to be optimized for smaller transactions (e.g., data requests, e-mail, GUI interactions) while the dedicated Web server 14 is optimized for large data transfers from the messaging platform to the subscriber. Data transfer is therefore much more efficient than if a single server had to handle both large and small data objects.

Process Flows

Figure 3:
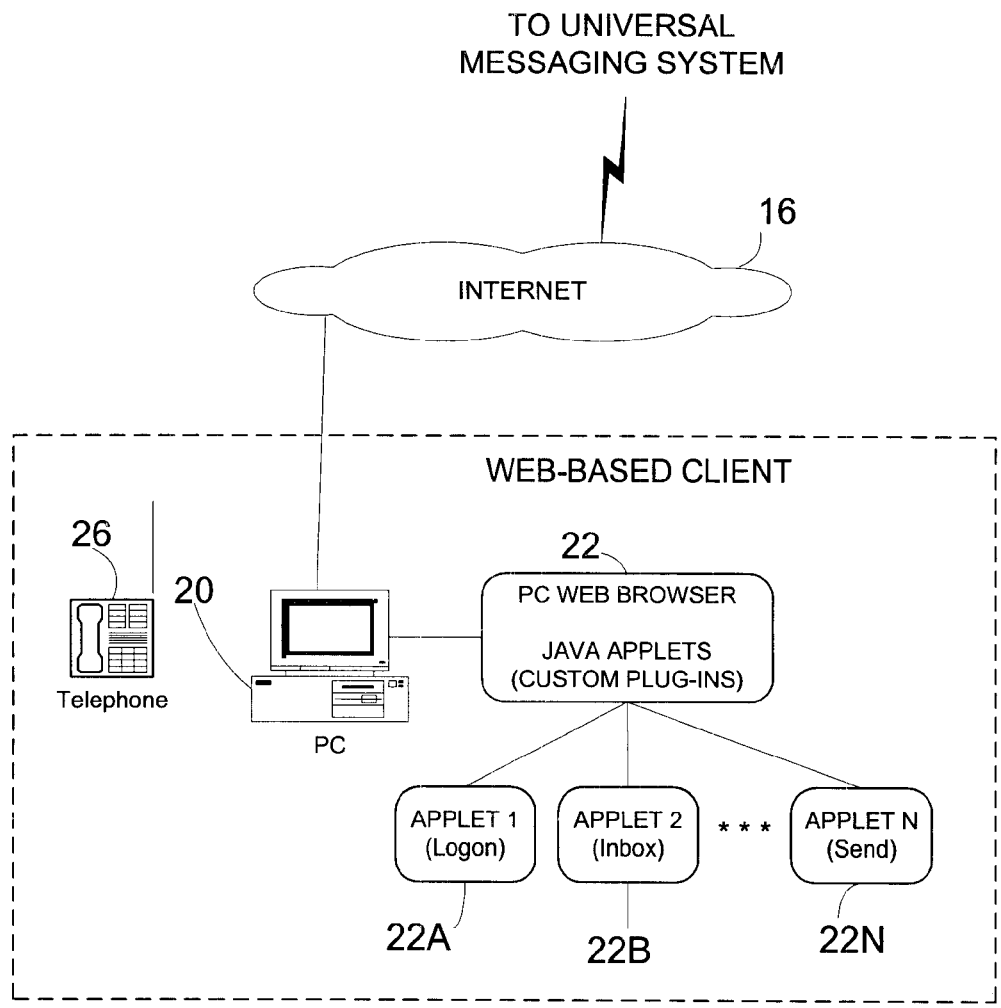
FIG. 3 depicts an expanded view of a Web-based client in accordance with the present invention.

Exemplary process flows will now be summarized for a number of typical processes, including: Logon, View Inbox, Open E-mail, Open Voice/Fax Message, Subscription Sign-up, Open Subscription, Send Message, Delete Message, New Message List, and Listen to E-mail Headers. As shown in FIG. 3, the flows typically employ the use of applets on the Web browser 22, which are represented by blocks 22A, 22B, . . . 22N in FIG. 3. These flows are depicted in FIGS. 4A through 4K, respectively.

"Log On" Transaction Flow

This process is illustrated in FIG. 4A. The transaction flow includes the following steps and acts.

1. The subscriber (Web-based client) accesses the URL of the Universal Messaging system's logon page.

2. The Internet server 12-3 presents the Logon page to the subscriber.

3. The subscriber (Web-based client) completes the Logon page with her/his user name and password and submits the details to the applet server 12-1.

4. The applet server 12-1 passes the Logon information (user name and password) to the Session Manager 10-5 via the Sockets Interface layer 12-7.

5. The Session Manager 10-5 passes the Logon information to the CMC API 10-4 and creates a session.

6. The CMC API 10-4 requests and receives user name and password verification from Addressing Services 10-1, which returns either a success or failure result.

7. The CMC API 10-4 returns the success/failure result to the Session Manager 10-5.

8. The Session Manager 10-5 passes the success/failure result to the applet server 12-1 software via the Sockets Interface layer 12-7.

9. If the verification was a success, the applet server 12-1 displays the Universal Messaging home page and automatically downloads any newer versions of applets appearing on that page. If the verification was a failure, the applet server 12-1 displays a page prompting the subscriber to re-enter her/his user name and password.

"View Inbox" Transaction Flow

This process is illustrated in FIG. 4B. The transaction flow includes the following steps and acts.

1. The subscriber clicks on the "Inbox" button, which causes the Inbox Java applet to send a request for message headers to the applet server 12-1.

2. The applet server 12-1 passes the request to the Session Manager 10-5 via the Sockets Interface 12-7.

3. The Session Manager 10-5 passes the request to the CMC API 10-4.

4. The CMC API 10-4 requests and receives a list of message headers from the e-mail message store 10-2 (both new and existing).

5. The CMC API 10-4 reformats the message header information into fields that the Inbox Java applet can understand and passes them to the Session Manager 10-5.

6. The Session Manager 10-5 passes the list of message headers to the applet server 12-1 via the Sockets Interface 12-7.

7. The applet server 12-1 passes the list to the Inbox Java applet which presents the message header list to the subscriber.

"Open E-mail" Transaction Flow

This process is illustrated in FIG. 4C. The transaction flow includes the following steps and acts.

1. The subscriber clicks on an e-mail message to open it, which causes the Inbox Java applet to send a request for that message to the applet server 12-1.

2. The applet server 12-1 passes the Logon ID (user name and password) and the Message ID to the Session Manager 10-5 via the Sockets Interface 12-7.

3. The Session Manager 10-5 validates the session and, if valid, passes the Message ID request on to the CMC API 10-4.

4. The CMC API 10-4 requests and receives the e-mail message in question from the Message Store, along with information about the size of the message and pointers to attachments (if any).

5. The CMC API 10-4 returns the e-mail message and other details to the Session Manager 10-5.

6. The Session Manager 10-5 passes the e-mail message and other details to the applet server 12-1.

7. The applet server 12-1 passes the e-mail message and other details to the Java applet on the subscriber's PC, which displays the message text for the subscriber.

"Open Voice/Fax Message" Transaction Flow

Figure 4D:
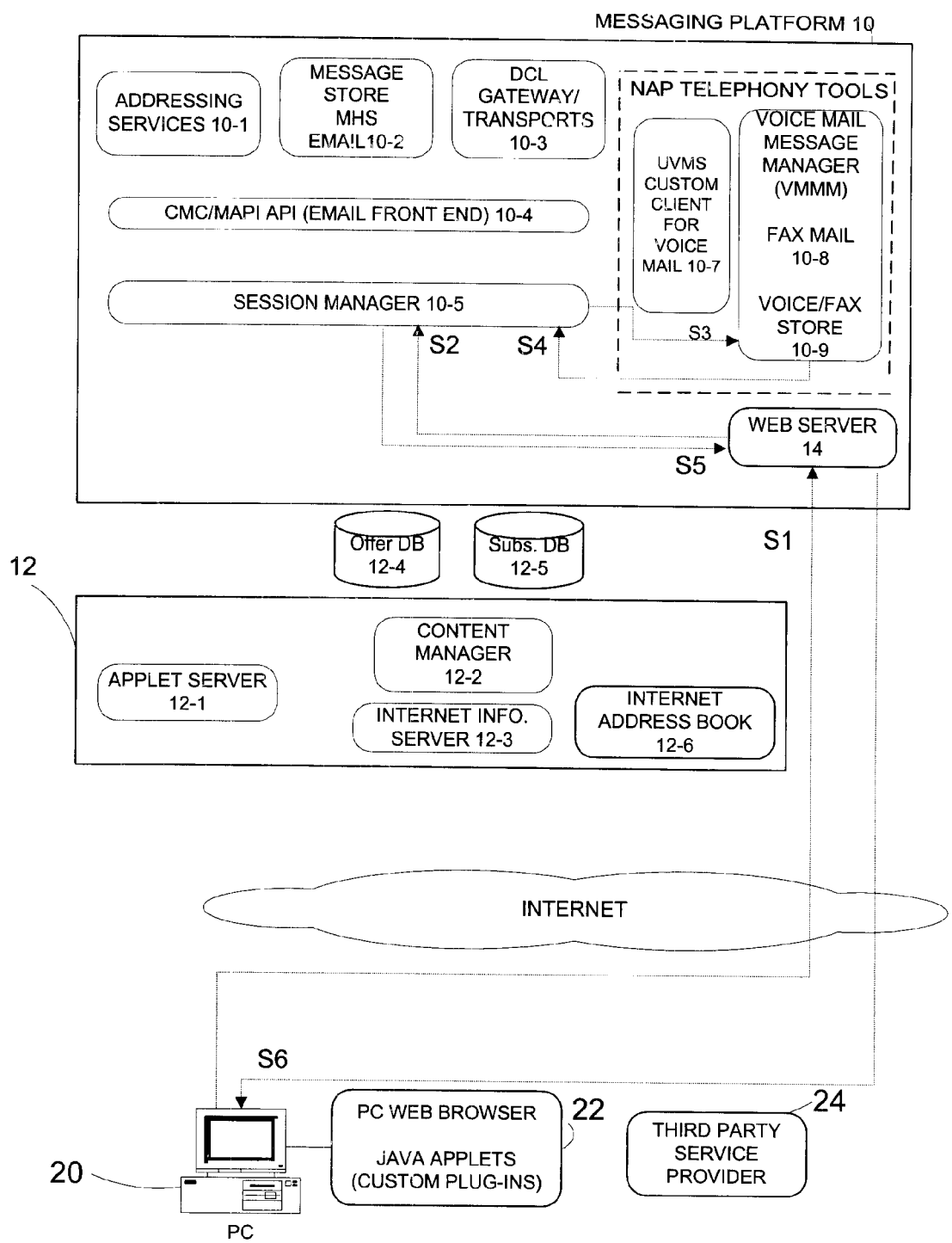

This process is illustrated in FIG. 4D. The transaction flow includes the following steps and acts.

1. The subscriber clicks on a voice or fax message to open it, and the Logon ID and URL for the message are passed to the Web Server 14.

2. The Web server 14 passes the Logon ID and URL information to the Session Manager 10-5.

3. The Session Manager 10-5 validates the session, and, if valid, passes the request to the Voice Message Management Module (VMMM) component of VNMS.

4. VMMM retrieves the message from the Voice and Fax Data File in segments and passes the segments on individually to the Session Manager 10-5. Each segment contains both the voice/fax data and information on the total number of bytes in each segment. The first segment also contains the total size of the entire message stream and is prefixed with the MIME type.

5. As each segment is received, the Session Manager 10-5 passes it on to the Web server 14.

6. In turn, the Web server 14 passes each received segment to the NAP Web Plug-in on the subscriber's PC.

Steps 4 through 6 are repeated until all message segments have been passed to the plug-in. The plug-in then plays or displays the voice or fax data.

"Subscription Sign-up" Transaction Flow

Figure 4E:
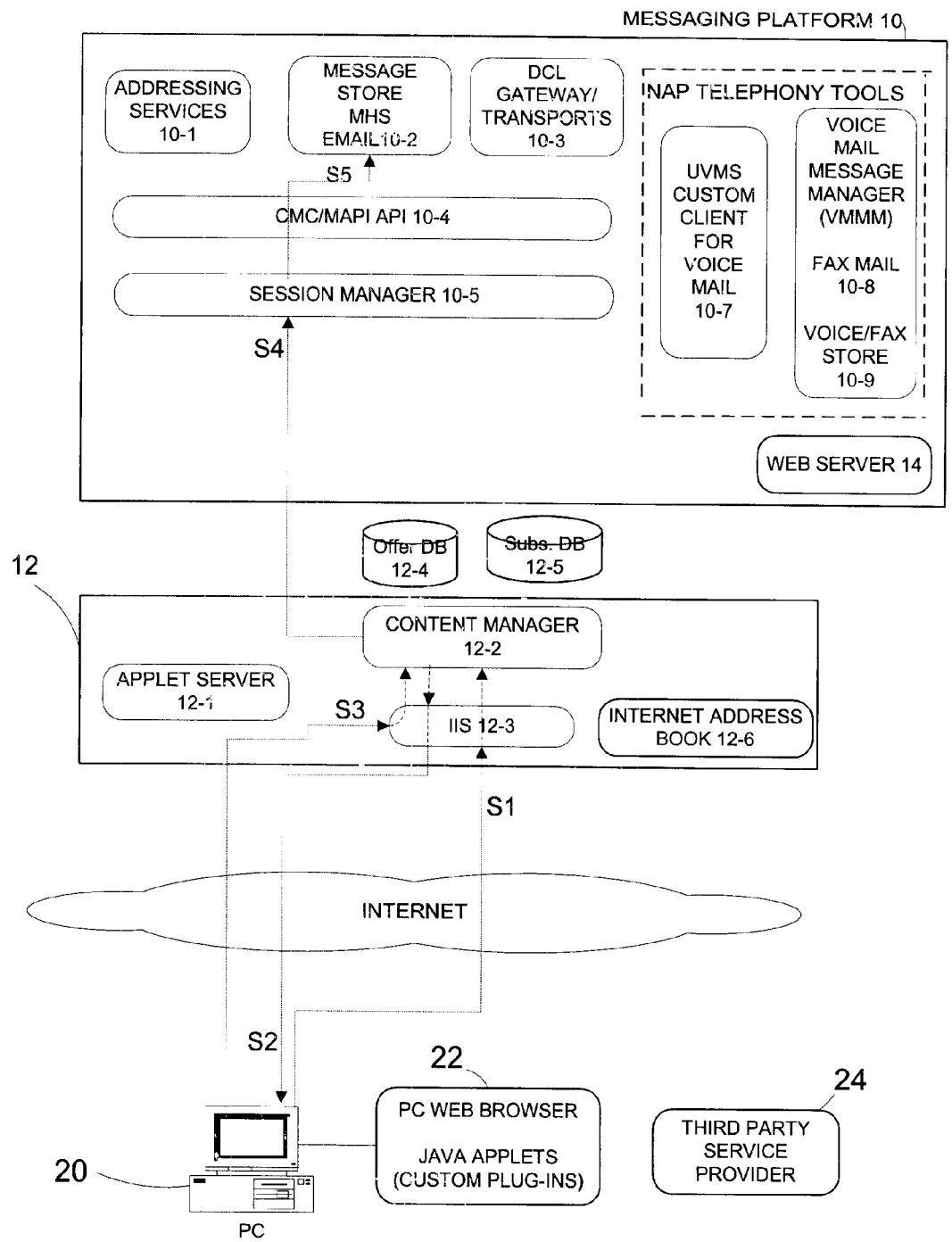

This process is illustrated in FIG. 4E. The transaction flow includes the following steps and acts.

1. The subscriber initiates the sign-up process by clicking on the new subscriptions icon, which causes the Java Subscriptions applet to send a request via the Internet server 12-3 to the Content Manager 12-2 for a Subscription Details form.

2. The Content Manager 12-2 returns the Subscription Data form via the Internet server 12-3.

3. The subscriber completes the form and submits the information to the Content Manager 12-2 via the Internet server 12-3.

4. The Content Manager 12-2 verifies the data to make sure the form was completed properly. If yes, the Content Manager 12-2 creates a new subscription record within the Content Manager 12-2 database and creates an e-mail message that contains a URL for all instances of that subscription for that user. The e-mail is sent to the Session Manager 10-5.

5. The Session Manager 10-5 passes the e-mail to the e-mail message store 10-2 via the CMC API 10-4.

"Open Subscription" Transaction Flow

Figure 4F:
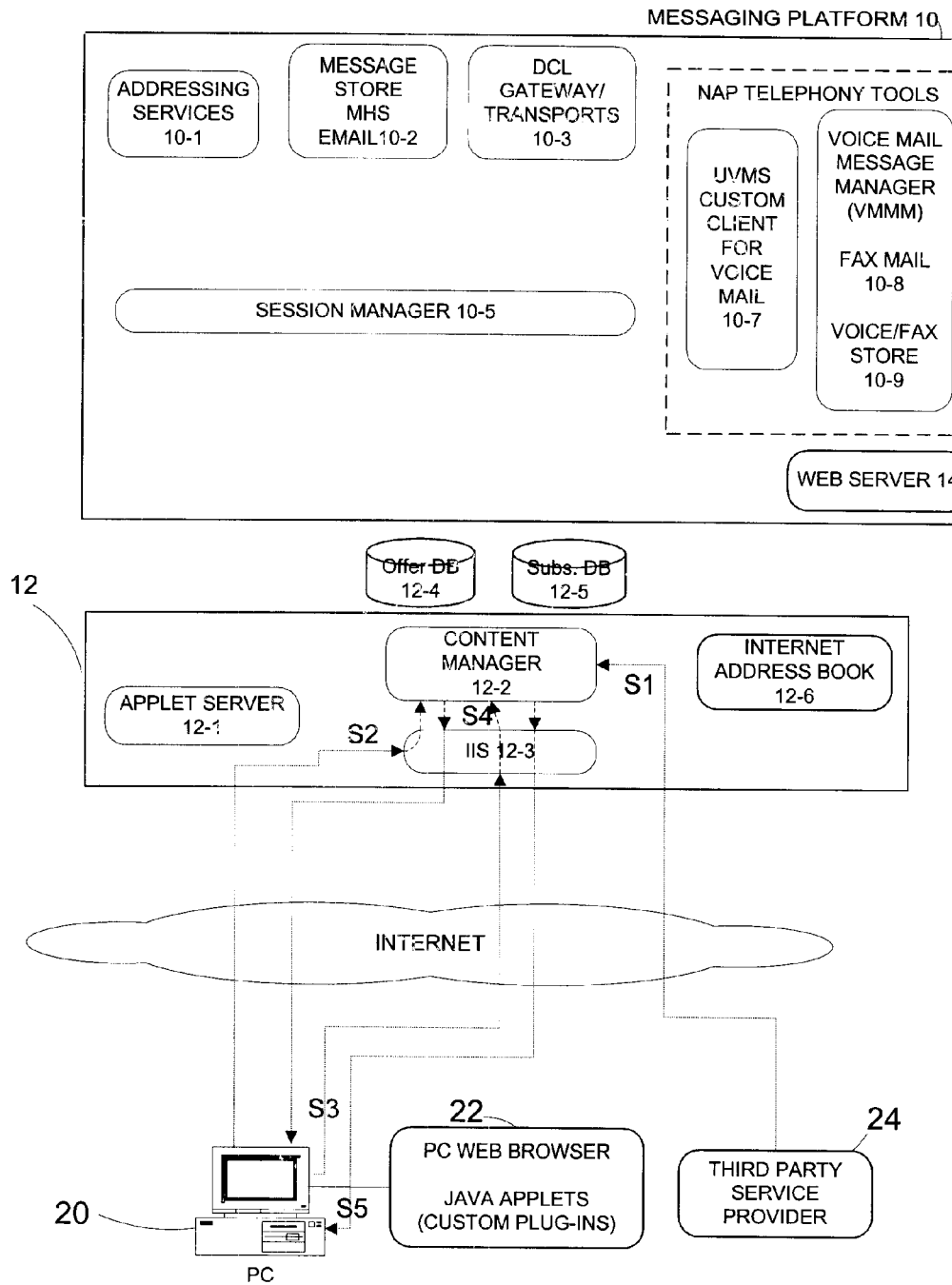

This process is illustrated in FIG. 4F. The transaction flow includes the following steps and acts.

1. The information provider transmits the subscriptions via File Transfer Protocol (FTP) to the data exchange area in the Content Manager 12-2.

2. The subscriber clicks on the Subscriptions button, which sends a request for a subscription list to the Content Manager 12-2.

3. The Content Manager 12-2 verifies that the subscriber has signed up for subscriptions. If yes, the Content Manager 12-2 returns a list of current subscriptions via the Internet server 12-3.

4. The subscriber selects the subscription he or she wishes to view and submits his/her choice to the Content Manager 12-2 (the subscription request contains the URL pointer for the content).

5. The Content Manager 12-2 processes the request and returns the content to the subscriber via the Internet server 12-3.

"Send Message" Transaction Flow

Figure 4G:
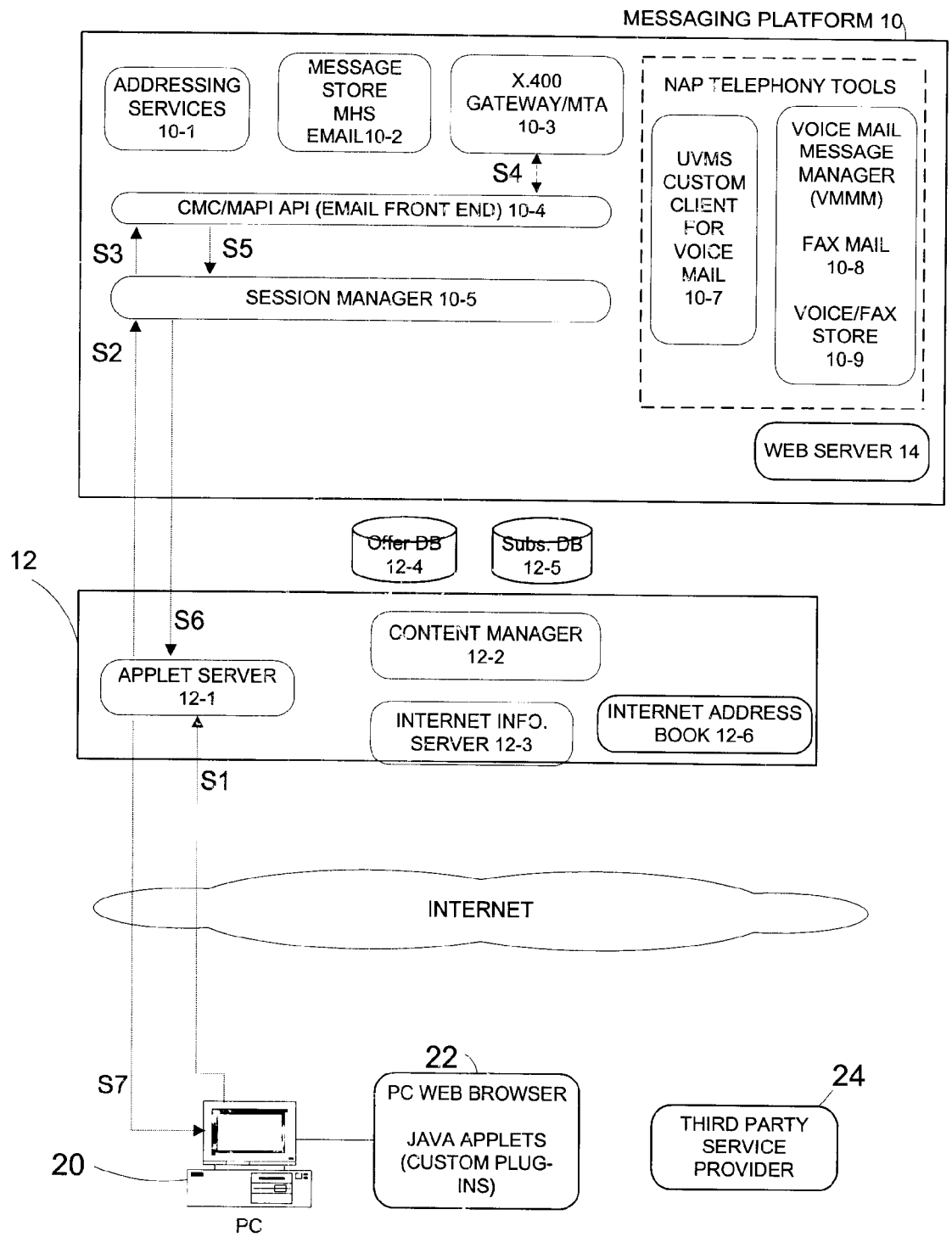

This process is illustrated in FIG. 4G. The transaction flow includes the following steps and acts.

1. The subscriber (Web-based client) composes a voice mail or an e-mail message and clicks Send. The Java applet passes the message and its attachments (if any) to the applet server 12-1.

2. The applet server 12-1 sends the message on to the Session Manager 10-5 via the Sockets Interface 12-7.

3. The Session Manager 10-5 passes the message and a send request to the CMC API 10-4.

4. The CMC API 10-4 sends the message to the Transport Service Provider 10-3, which, depending on the message's final destination, uses the X.400 MTA or the X.400/SMTP gateway to transmit the message. The Transport Service Provider returns a success or a failure result to the CMC API 10-4.

5. The CMC API passes the success/failure result to the Session Manager 10-5.

6. The Session Manager 10-5 passes the success/failure result to the applet server 12-1 via the Sockets Interface 12-7.

7. The applet server 12-1 passes the success/failure result to the Java applet, which notifies the subscriber whether the message has been sent or not sent.

"Delete Message" Transaction Flow

Figure 4H:
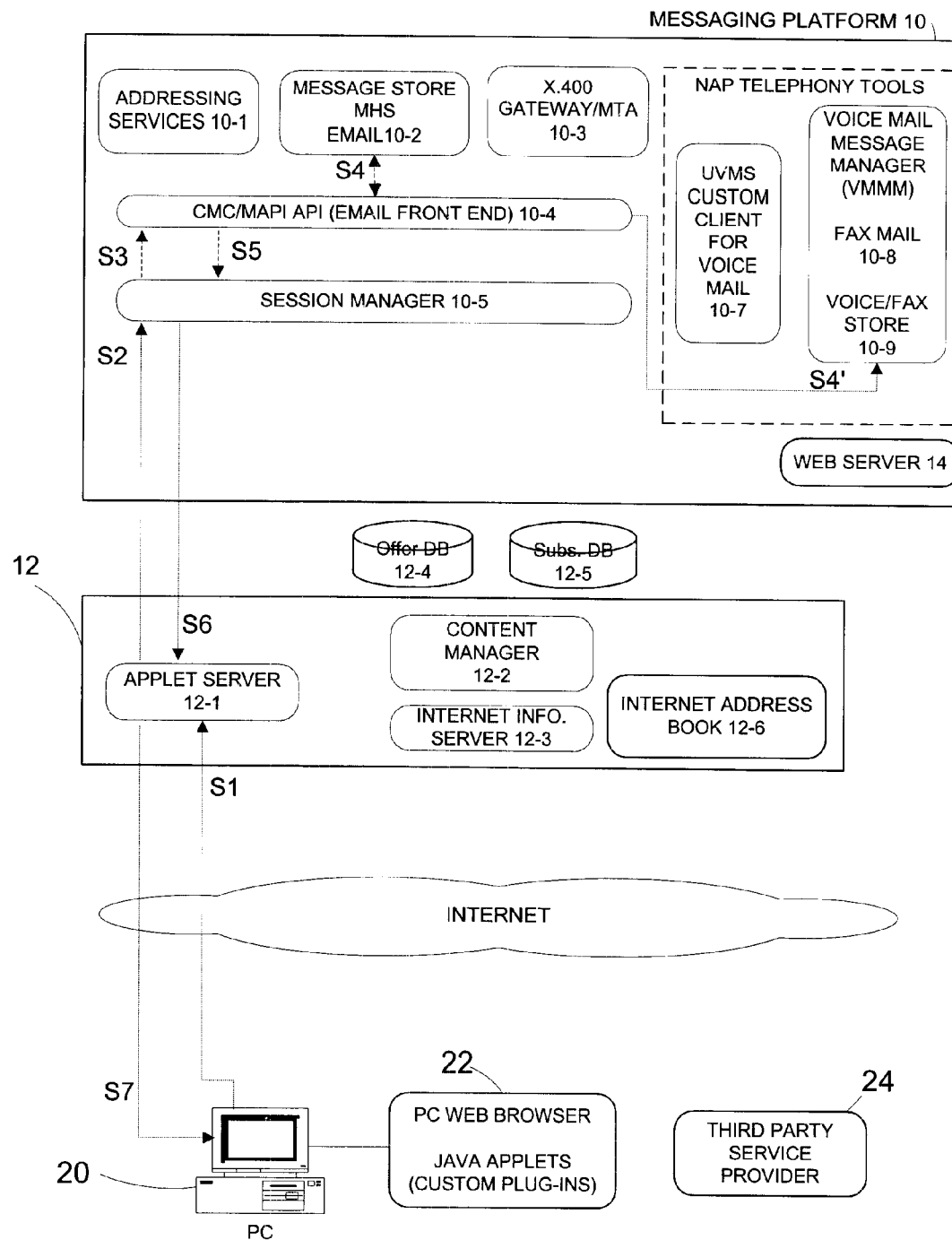

This process is illustrated in FIG. 4H. The transaction flow includes the following steps and acts.

1. The subscriber selects a message (voice, fax, or e-mail) for deletion. The Java applet passes the delete request (including Session ID and Message ID) to the applet server 12-1.

2. The applet server 12-1 passes the delete request and information to the Session Manager 10-5.

3. The Session Manager 10-5 validates the session and, if successful, passes the delete request and information on to the CMC API 10-4.

4. The CMC API 10-4 passes the delete request on to the Message Store. If the deleted message was a voice or fax message, it also sends a delete request to the VMMM 10-8, which deletes the message in the voice/fax data file.

5. The CMC API 10-4 sends a success or failure result to the Session Manager 10-5.

6. The Session Manager 10-5 passes the result to the applet server 12-1 via the Sockets Interface 12-7.

7. The applet server 12-1 passes the result to the Java applets, which notifies the subscriber if the message has been deleted or not deleted by changing the message list in the Inbox.

"New Message List" Transaction Flow

Figure 4I:
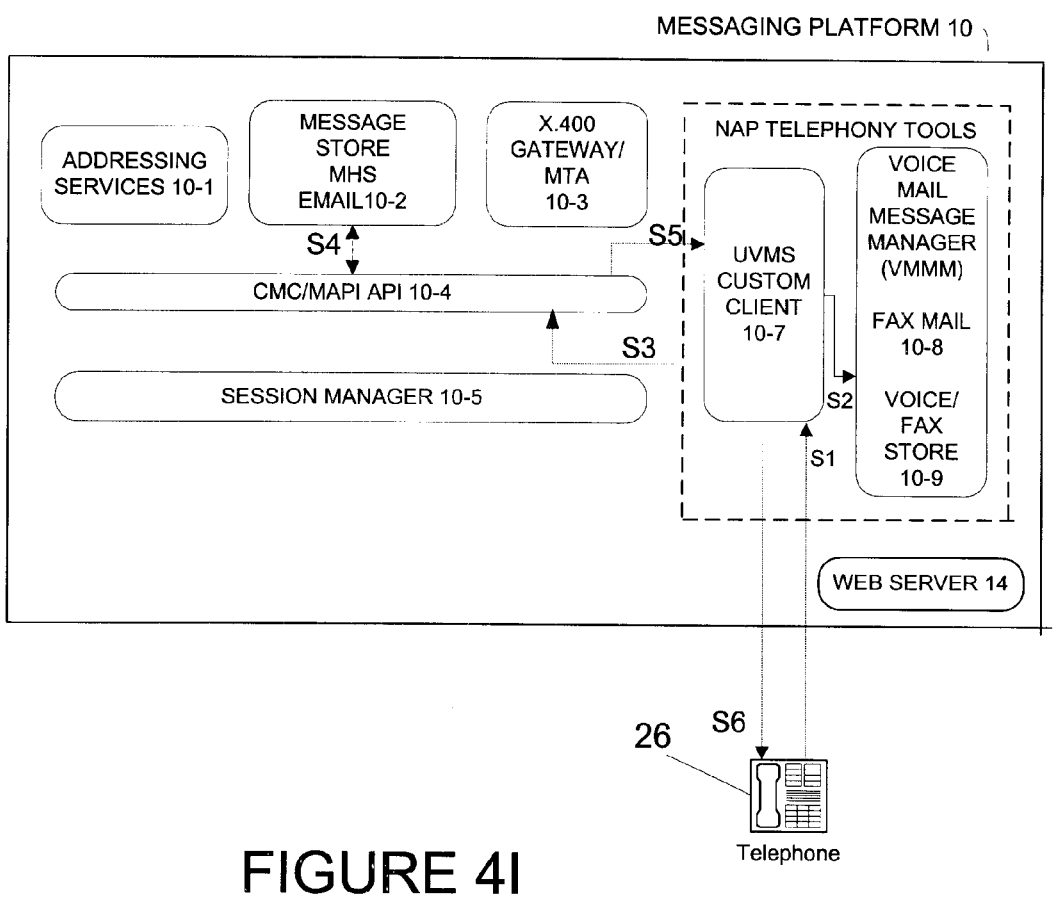

This process is illustrated in FIG. 4I. The transaction flow includes the following steps and acts.

1. The subscriber dials into his voice mail account and accesses the UVMS Custom Client 10-7.

2. The Custom Client 10-7 retrieves new fax and voice message counts from the VMMM 10-8.

3. Concurrent with Step 2, the Custom Client sends a request for a new e-mail message count to the CMC API 10-4.

4. The CMC API 10-4 requests and receives a count of new e-mail messages from the message store 10-2.

5. The CMC API 10-4 passes the new e-mail message count back to the UVMS Custom Client 10-7.

6. The UVMS Custom Client 10-7 presents the new message counts to the user, e.g.: "You have 5 new e-mail messages, 3 new voice messages, and 1 new fax message."

"Listening to E-mail Headers" Transaction Flow

Figure 4J:
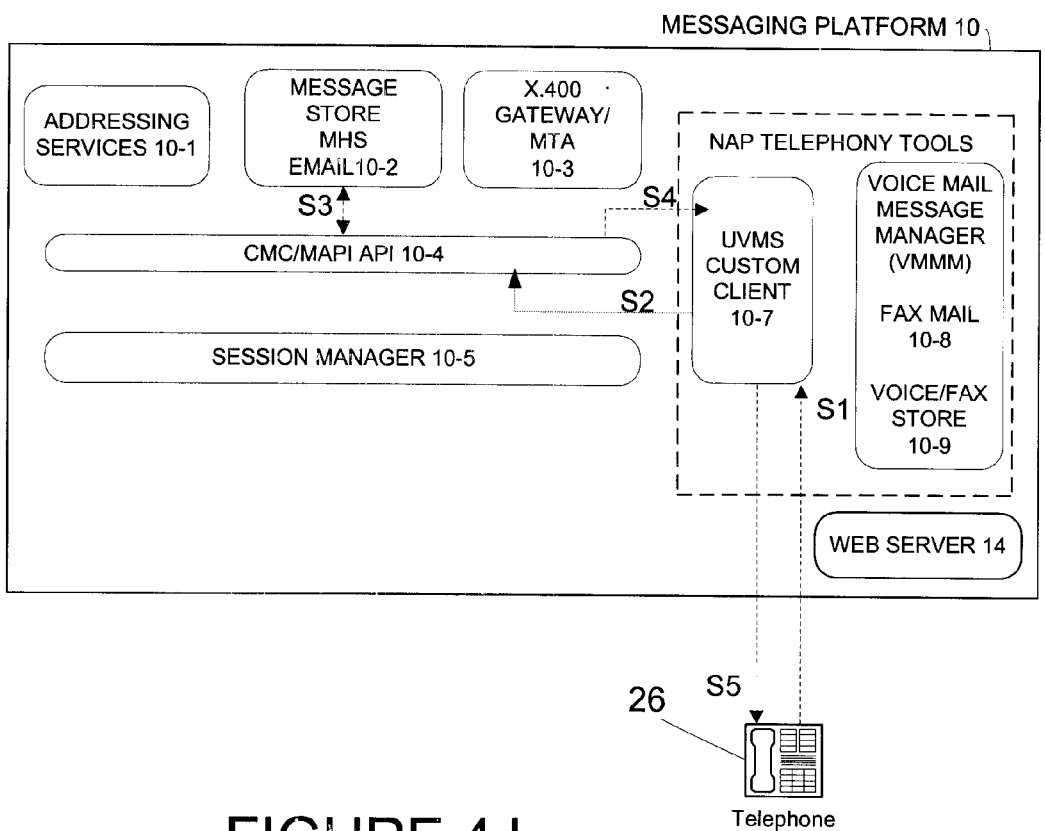

This process is illustrated in FIG. 4J. The transaction flow includes the following steps and acts.

1. The subscriber selects the "Listen to e-mail headers" option and a request for the first e-mail header is sent to the UVMS Custom Client 10-7.

2. The Custom Client sends a request for the first e-mail header (including User ID and Message ID) to the CMC API 10-4.

3. The CMC API 10-4 requests and receives the e-mail header specified by the Custom Client from the message store 10-9.

4. The CMC API 10-4 passes the e-mail message header back to the UVMS Custom Client 10-7.

5. The UVMS Custom Client 10-7 plays the message header for the subscriber.

This process is repeated for each e-mail message header the subscriber selects.

"Provisioning a Subscriber"

Figure 4K:
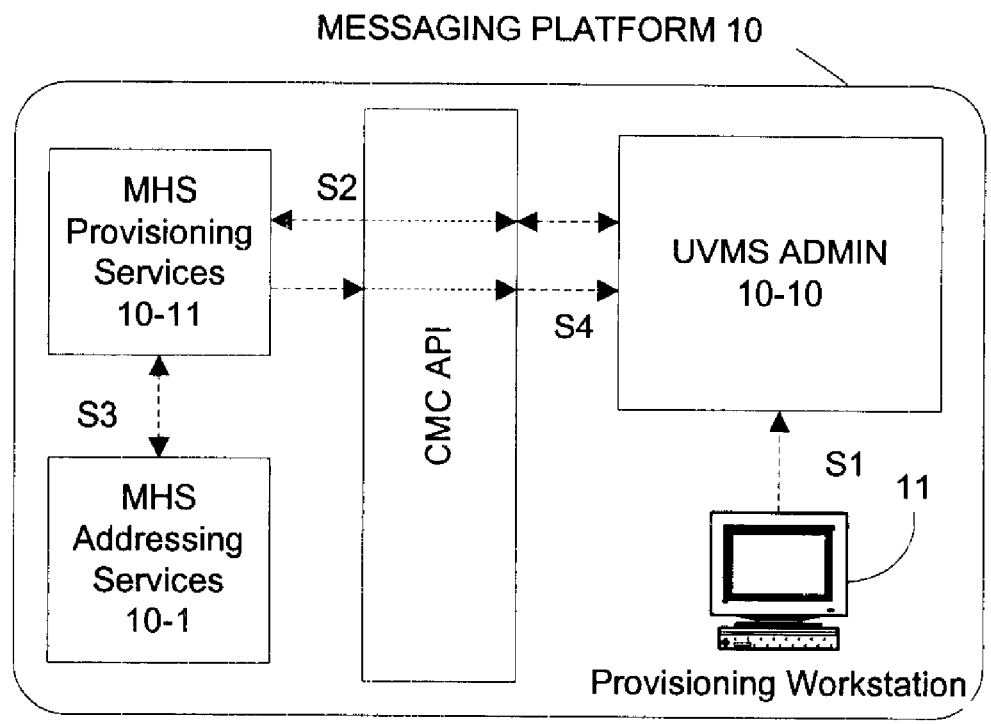

FIG. 4K depicts a typical process flow when a Universal Messaging subscriber is provisioned.

1. The operator, using a workstation 30, performs the initial account set-up by entering standard subscriber data, including setting a UVMS class of service options required for Universal Messaging functionality.

2. UVMS Admin 10-10 creates a NAP address and a handset access logon ID for the subscriber and passes the subscriber data to Message Handling Service (MHS) Provisioning Services (MPS) 10-11 via the CMC API 10-4.

3. MPS provisions MHS Addressing Services 10-1 with the subscriber data from UVMS. MHS Addressing Services returns subscriber data specific to e-mail communications and Web browser access, such as profile name, password, SMTP address, and X.400 address.

4. MPS returns the MHS-specific subscriber data to UVMS Admin. The subscriber is now successfully provisioned.

E. "Open" Architecture

Figure 5:
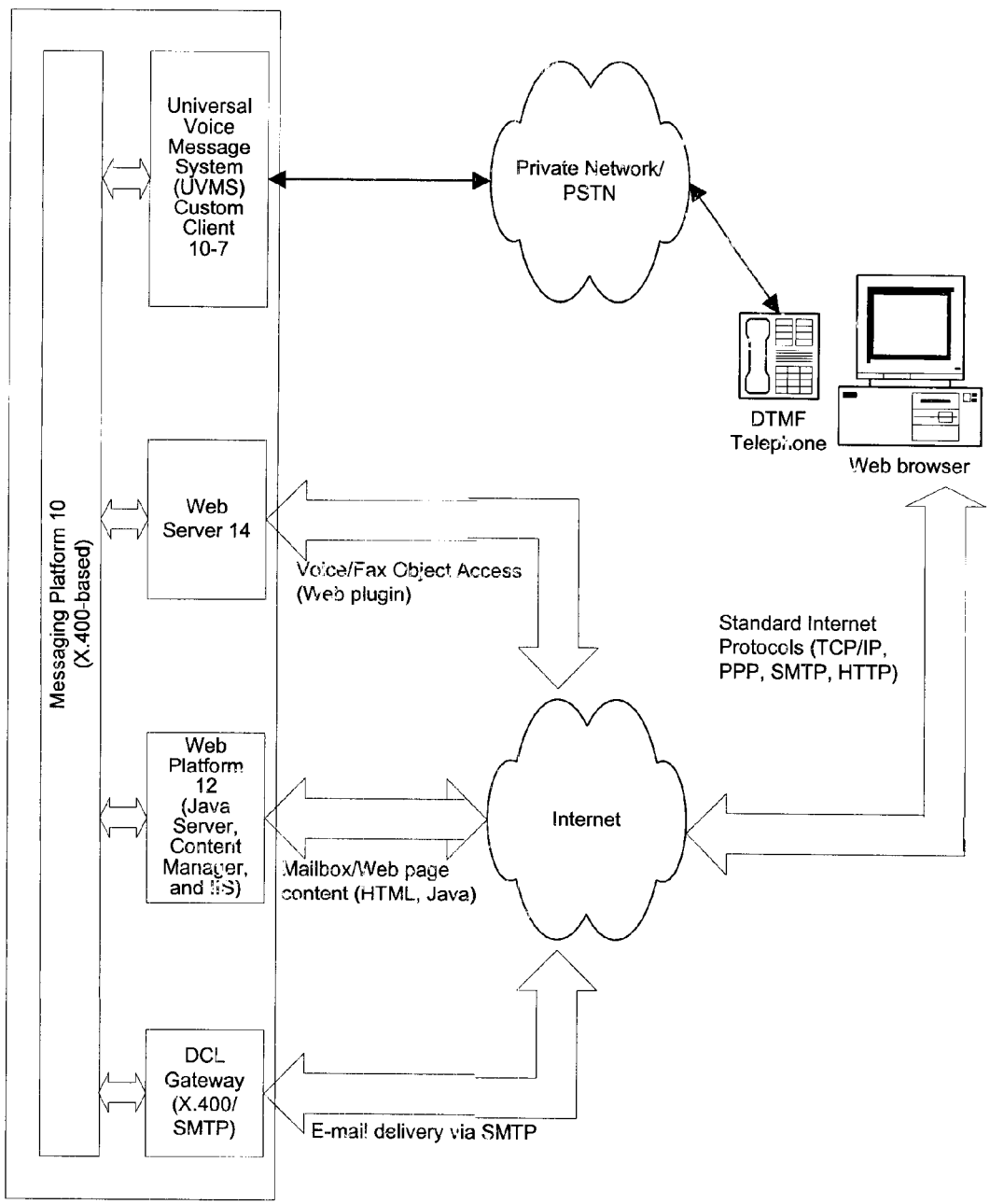
FIG. 5 illustrates how the different components of the inventive Universal Messaging system use standard interfaces and protocols to provide unified messaging services.

The "open architecture" of the presently preferred embodiment is illustrated in FIG. 5. In particular, FIG. 5 illustrates how the different components of the inventive Universal Messaging system use standard interfaces and protocols to provide unified messaging services.

Architecture Requirements

The preferred embodiment of the present invention is a carrier-grade system based on components that are known for their reliability, availability, and openness. The Messaging Platform 10 is based on proven technology, the same solutions at work in voice and fax messaging deployments around the world. The Web Platform 12 is based on commodity products such as Windows NT and Java. In addition, the subscriber does not have to go through a laborious installation process in order to use Universal Messaging—all that is needed is a touch-tone phone and a Java-enabled browser with which to connect to the World Wide Web, both of which are well known. Even the NAP Web Plug-In, used to access voice and fax messages, is automatically downloaded and installed the first time a subscriber accesses his or her account.

Moreover, the Universal Messaging architecture takes advantage of commodity messaging technologies and protocols, such as the CMC API and X.400 messaging. This ensures that as technology progresses, the system will continue to interoperate with other systems and standards.

Merging Telephony and Internet Environments

The philosophy behind the interactions over a telephony system versus the interactions over the Internet are vastly different. During a telephone call, a session is established and maintained from "off hook" to "on hook." Each call is a single session. Conversely, the Internet is "sessionless," i.e., interaction is based on transactions (a subscriber requesting a web page or an applet) rather than on the total time the subscriber has potential access to the Internet. To resolve the potential conflict between session-based and sessionless systems, the Session Manager 10-5 was developed.

The Session Manager creates an artificial session into the Messaging Platform 10 for Web transactions. It serves as a communications layer between the Messaging Interface's API 10-4 and the Sockets Interface 12-7 of the Web Platform 12, and between the API 10-4 and the Web server 14.

Industry-Standard Architecture

The preferred architecture behind Universal Messaging relies on industry-standard systems, including: a Universal Voice Message System (UVMS), a high-capacity, high-volume voice and fax messaging system employed around the world; and a Microsoft NT Server, an enterprise-grade operating system that supports the Web Platform 12 and provides the advantages of a commodity and recognizable interface.

In addition, the inventive Universal Messaging system supports and utilizes a variety of industry-standard components, including: X.400 (1984, 1988), SMTP, TCP/IP, Common Messaging Calls (CMC), MIME Attachments, Java applets and HTML.

F. Conclusion

We have described an inventive Universal Messaging system comprising, inter alia, a Session Manager 10-5, Content Manager 12-2, and Web server 14. The scope of protection of the claims set forth below (following the appendix) is not intended to be limited to the particulars described herein in connection with the detailed description of presently preferred embodiments.

Appendix—Exemplary Predefined Object Content Types

The predefined object content type specifies the content type of the content item. A NULL value designates an undefined content item type.

| | |
|---|---|
| CMC_CT_PLAIN_TEXT | Specifies plain or unformatted text content. |
| CMC_CT_GIF_IMAGE | Specifies image data content in the form of the Graphics Image Format used by MIME and the World Wide Web. |
| CMC_CT_JPEG_IMAGE | Specifies image data content in the form of the ISO Joint Picture Encoding Group standard used by MIME and the World Wide Web. |
| CMC_CT_BASIC_AUDIO | Specifies audio data content in the form of audio encoded using 8-bit ISDN mu-law or PCM defined by CCITT Recommendation G.711 with a sample rate of 8000 Hz and with a single channel. |
| CMC_CT_MPEG_VIDEO | Specifies video content in the form of the ISO Motion Picture Encoding Group, ISO 11172 standard used by MIME and the World Wide Web. |
| CMC_CT_MESSAGE | Specifies that the content is an encapsulated message. |
| CMC_CT_PARTIAL_MESSAGE | Specifies that the content is a portion of another message. This content type allows a large message to be delivered as |

-continued

| | |
|---|---|
| CMC_CT_EXTERNAL_MESSAGE | several separate pieces to facilitate receipt.<br>Specifies that the content is external to the message. The content information property contains a textual reference to the external content information. |
| CMC_CT_APPLICATION_OCTET_STREAM | Specifies that the content is an application dependent stream of octets. |
| CMC_CT_APPLICATION_POSTSCRIPT | Specifies that the content is a PostScript program. |
| CMC_CT_ALTERNATIVE_MULTIPART | Specifies that the content is one of an alternative form of content to another note or content item within the message object. |
| CMC_CT_DIGEST_MULTIPART | Specifies that the content is one of a group of related messages within the message object. The messages may serve as a sequence of discussions captured in a thread of messages as is found on bulletin board systems. |
| CMC_CT_MIXED_MULTIPART | Specifies that the content is one of an ordered sequence of messages within the message object. |
| CMC_CT_PARALLEL_MULTIPART | Specifies that the content is one of a group of arbitrary ordered sequence of messages within the message object. |
| CMC_CT_OLE | Specifies that the content item type is OLE (Object Linking and Embedding) object content item. |
| CMC_CT_X400_G3_FAX | Specifies that the content represents Group 3 facsimile images, a sequence of bit strings. Each G3 data component encodes a single page of data as dictated by Recommendations T.4 and T.30. |
| CMC_CT_X400_G4_FAX | Specifies that the content represents a final-form of document of the sort that is processable by Group 4 Class 1 facsimile terminals. |
| CMC_CT_X400_ENCRYPTED | Specifies that the content is bit strings and encoded in accordance with the basic encoding rules of recommendation X.209. |
| CMC_CT_X400_NATIONALLY_DEFINED | Specifies the content is an information object whose semantics and abstract syntax are nationally defined by a country whose identity is bilaterally agreed by the message's originator and all of its potential recipients. |
| CMC_CT_X400_FILE_TRANSFER | Specifies that the content information consists of relatively large amounts of data. The content information property contains the textual reference to its semantics and abstract syntax, which are denoted by an object identifier. |
| CMC_CT_X400_VOICE | Specifies that the content is the digitized speech, a bit string. Its encoding are currently not defined in the 1988 X.420 Recommendations. |
| CMC_CT_X400_VIDEOTEXT | Specifies that the content represents videotext data. Its syntax is defined in the T.100 and T.101 recommendations. |
| CMC_CT_X400_MIXED_MODE | Specifies that the content represents a final-form document of the sort that is processable by mixed-mode Teletex terminals and Group 4 class 2 and 3 facsimile terminals. |
| CMC_CT_X-400_PRIVATELY_DEFINED_6937 | Specifies that the content is privately defined. The content is encoded in accordance to ISO 6937 specified character sets and encoding rules. |
| CMC_CT_X400_EXTERNAL_TRACE | Specifies the content contains X.400 external trace information for diagnostic purpose. |
| CMC_CT_X400_INTERNAL_TRACE | Specifies the content contains X.400 internal trace information for diagnostic purpose. |
| CMC_CT_SMTP_SESSION_TRANSCRIPT | Specifies the content contains SMTP session transcript information for diagnostic purpose. |

We claim:

1. A Universal Messaging system including a mechanism to connect a sessionless environment, including the World Wide Web, with a real-time, session-based environment, including a voice/fax mail system, comprising:

(a) a messaging platform supporting an e-mail messaging system and a voice/fax messaging system, wherein messages stored by said e-mail and voice/fax messaging systems are accessible to a remote Web-based client employing a Web browser interface via a wide area communications network operatively coupled to said messaging platform through a session based interface; and (b) a session manager supported by said messaging platform for initiating and maintaining a session between said messaging platform and said Web-based client;

wherein, when the Web-based client first requests access to voice, fax, or e-mail message services via the Web browser, the system receives from the client a mail profile identifier and a password, and then the session manager establishes a session with the messaging platform and associates a session ID with the session, and then the session manager saves the profile identifier, password, and session ID in a session record; and wherein subsequent requests from the Web browser interface are automatically accompanied by the user's mail profile identifier, password and session ID.

2. A Universal Messaging system as recited in claim 1, wherein said messaging platform comprises a Common Messaging Calls (CMC) layer operatively coupled to said session manager means; an e-mail message store operatively coupled to said CMC layer; and a voice/fax message store operatively coupled to said session manager means.

3. A Universal Messaging system as recited in claim 2, wherein, when the Web-based client first requests access to voice, fax, or e-mail message services via the Web browser, the user is required to enter a mail profile identifier and a password, and then the session manager establishes a session with the CMC layer of the messaging platform.

4. A Universal Message system as recited in claim 3, wherein the session manager attempts to validate each client request against the session record to verify that the user requesting service is already logged in; and wherein a new CMC session is established if the session manager cannot locate the identifier/password combination in the session record.

5. A Universal Messaging system as recited in claim 4, wherein the session manager means automatically logs a user off the CMC layer, deleting the user's session record, if no activity is detected within a predetermined period of time.

6. In a Universal Messaging system, a method for initiating and maintaining a session between a messaging platform and a Web-based client, comprising the steps of:

receiving a request from a user of a Web-based client for access to voice, fax, or e-mail message services;

requiring the user to enter a mail profile identifier and password;

using a session manager to establish a session between the Web-based client and a Common Messaging Calls (CMC) layer of the messaging platform and associating a session ID with the session; and saving the profile identifier, password, and session ID in a session record.

7. A method as recited in claim 6, wherein subsequent requests from the Web browser interface are automatically accompanied by the user's mail profile identifier, password and session ID.

8. A method as recited in claim 7, further comprising the step of validating each client request against the session record to verify that the user requesting service is already logged in; and establishing a new session if the identifier/password combination in the session record cannot be located.

9. A method as recited in claim 8, further comprising the step of automatically logging the user off the CMC layer and deleting the user's session record if no activity is detected within a predetermined period of time.

10. A Universal Messaging system, comprising:

(a) a messaging platform supporting an e-mail messaging system, a voice/fax messaging system, an e-mail message store operatively coupled to said e-mail messaging system, a voice/fax message store operatively coupled to said voice/fax messaging systems, and a session manager application operatively coupled to said messaging platform wherein said session manager application maintains a session between remote Web-based clients and said messaging platform;

(b) a Web platform operatively coupled to said messaging platform; and (c) a large object server operatively associated with said messaging platform;

wherein messages stored in said e-mail and voice/fax message stores are accessible to the remote Web-based clients via a wide area communications network operatively coupled to said Web platform and said large object server.

11. A Universal Messaging system as recited in claim 10, wherein said messaging platform further supports a TCP/IP interface operatively coupled to said session manager application and to said Web platform.

12. A Universal Messaging system as recited in claim 11, wherein said messaging platform further comprises a Common Messaging Calls (CMC) interface operatively coupled to said e-mail and voice/fax messaging systems and to said session manager application; and wherein said session manager application maintains a session between said remote client(s) and said CMC interface.

13. A Universal Messaging system as recited in claim 12, wherein said session manager application retains a session record for each logged-on user to obviate the need for a CMC logon for each and every service request of said logged-on user(s).

14. A Universal Messaging system as recited in claim 13, wherein said messaging platform further comprises:

an addressing services object for providing user name and password verification; and a transports object for interfacing to SMTP and X.400 servers.

15. A Universal Messaging system as recited in claim 10, wherein said voice/fax messaging system comprises a Universal Voice Messaging System (UVMS) Custom Client and a Voice Mail Message Manager (VMMM), wherein said UVMS Custom Client retrieves new fax and voice message counts from the VMMM.

16. A Universal Messaging system as recited in claim 10, wherein said Web platform controls the remote clients' interface to the messaging platform by accepting requests from the client and passing prescribed types of information back to the clients.

17. A Universal Messaging system as recited in claim 10, wherein said Web platform comprises a content manager application for receiving information from content providers and formatting said information into multimedia containers to be distributed to users.

18. A Universal Messaging system as recited in claim 17, wherein said Web platform includes or is operatively coupled to a first database containing e-mail advertisements and a second database containing news-type information from a content provider.

19. A Universal Messaging system as recited in claim 10, wherein said Web platform supports:

an applet server for providing applets to said remote clients;

a content manager application for receiving information from a content provider, formatting said information into multimedia containers and distributing said containers to said remote clients; and an Internet server operatively coupled to said content manager application.

20. A Universal Messaging system as recited in claim 19, wherein said Web platform further supports a communications object, operatively coupled to said Internet server, providing an address book for use by said Internet server.

21. A Universal Messaging system as recited in claim 10, wherein said messaging platform further supports a session manager application operatively coupled to said Web platform and large object server, and a TCP/IP interface operatively coupled to said session manager application and to said Web platform; and wherein e-mail messages stored in the e-mail message store are provided to said remote clients via the TCP/IP interface in said messaging platform, said Web platform and said wide area communications network, and voice and fax messages stored in said voice/fax store are provided to said remote clients via said session manager, large object server and wide area communications network, whereby said voice and fax messages bypass said TCP/IP interface in said messaging platform.

22. A Universal Messaging system as recited in claim 10, wherein:

said messaging platform further supports a session manager application operatively coupled to said Web platform and large object server; a TCP/IP interface operatively coupled to said session manager application and to said Web platform; and a Common Messaging Calls (CMC) interface operatively coupled to said e-mail and voice/fax messaging systems and to said session manager application; wherein said session manager application maintains a session between said remote clients and said CMC interface, and retains a session record for each logged-on user to obviate the need for a CMC logon for each and every service request of said logged-on user(s);

said Web platform controls the remote clients' interface to the messaging platform by accepting requests from the client and passing prescribed types of information back to the client computer;

said Web platform supports a content manager application for receiving information from content providers and formatting said information into multimedia containers to be distributed to users; an applet server for providing applets to said remote clients; and an Internet server operatively coupled to said content manager application; and e-mail messages stored in the e-mail message store are provided to said remote clients via the TCP/IP interface in said messaging platform, said Web platform and said wide area communications network, and voice and fax messages stored in said voice/fax store are provided to said remote clients via said session manager, large object server and wide area communications network, whereby said voice and fax messages bypass said TCP/IP interface in said messaging platform.

23. A Universal Messaging system as recited in claim 22, wherein the system performs a "Log On" process that includes the following transactions:

a subscriber employs the remote client to access a Universal Messaging system logon page;

the Internet server presents the Logon page to the subscriber;

the subscriber employs the remote client to complete the Logon page with the user's user name and password and submits the same to the applet server;

the applet server passes the user name and password to the session manager;

the session manager passes the Logon information to the CMC API and creates a session;

the CMC API obtains a success/failure result in verifying the user name and password;

the CMC API returns the success/failure result to the session manager;

the session manager passes the success/failure result to the applet server;

if the verification was a success, the applet server displays the Universal Messaging home page and automatically downloads any newer versions of applets appearing on that page; and if the verification was a failure, the applet server displays a page prompting the subscriber to re-enter her/his user name and password.

24. A Universal Messaging system as recited in claim 22, wherein the system performs a "View Inbox" process that includes the following transactions:

the subscriber employs the remote client to select an "Inbox" button, thereby causing an Inbox applet to send a request for message headers to the applet server;

the applet server passes the request to the session manager;

the session manager passes the request to the CMC API;

the CMC API requests and receives a list of message headers from the e-mail message store;

the CMC API reformats the message header information into fields that the Inbox applet can understand and passes them to the session manager;

the session manager passes the list of message headers to the applet server via the Sockets Interface; and the applet server passes the list to the Inbox applet and the Inbox applet presents the message header list to the subscriber.

25. A Universal Messaging system as recited in claim 22, wherein the system performs an "Open E-mail" process that includes the following transactions:

the subscriber employs the remote client to select an e-mail message to open, and an Inbox applet sends a request for that message to the applet server;

the applet server passes a Logon ID (user name and password) and a Message ID to the session manager;

the session manager validates the session and, if valid, passes the Message ID request on to the CMC API;

the CMC API requests and receives the e-mail message from a message store along with information about the size of the message and pointers to any attachments;

the CMC API returns the e-mail message and other details to the session manager;

the session manager passes the e-mail message and other details to the applet server; and the applet server passes the e-mail message and other details to an applet on the remote client, and the message text is displayed for the subscriber.

26. A Universal Messaging system as recited in claim 22, wherein the system performs an "Open Voice/Fax Message" process that includes the following transactions:

the subscriber employs the remote client to select a voice or fax message to open, and a Logon ID and URL for the selected message are passed to the Web server;

the Web server passes the Logon ID and URL information to the session manager;

the session manager validates the session and, if valid, passes the request to the voice/fax messaging system;

the voice/fax messaging system retrieves the message in segments and passes the segments on individually to the session manager, wherein each segment contains both the voice/fax data and information on the total number of bytes in that segment and a first segment contains the total size of the entire message;

as each segment is received by the session manager, the session manager passes it on to the Web server;

the Web server passes each received segment to a plug-in on the remote client; and when all message segments have been passed to the plug-in, the plug-in plays or displays the voice or fax data.

27. A Universal Messaging system as recited in claim 22, wherein the system performs a "Subscription Sign-up" process that includes the following transactions:

a subscriber employs the remote client to initiate the sign-up process by clicking on a new subscriptions icon, and a Subscriptions applet sends a request via the Internet server to the Content Manager for a Subscription Details form;

the Content Manager returns the Subscription Data form via the Internet server;

the subscriber completes the form on the remote client and submits the information to the Content Manager via the Internet server;

the Content Manager verifies the data to make sure the form was completed properly and, if so, creates a new subscription record within a Content Manager database and creates an e-mail message that contains a URL for all instances of that subscription for that user, and then the e-mail message is sent to the session manager; and the session manager passes the e-mail to the e-mail message store via the CMC API.

28. A Universal Messaging system as recited in claim 22, wherein the system performs an "Open Subscription" process that includes the following transactions:

an information provider transmits subscriptions to a data exchange area in the Content Manager;

the subscriber clicks on a Subscription button on the remote client to send a request for a subscription list to the Content Manager;

the Content Manager verifies that the subscriber has signed up for subscriptions and, if so, returns a list of current subscriptions via the Internet server;

the subscriber selects the subscription he or she wishes to view and submits his/her choice to the Content Manager, wherein the subscription request contains the URL pointer for the content; and the Content Manager processes the request and returns the content to the subscriber via the Internet server.

29. A Universal Messaging system as recited in claim 22, wherein the system performs a "Send Message" process that includes the following transactions:

a subscriber uses the remote client to compose a voice mail or an e-mail message to send, and an applet passes the message and its attachments, if any, to the applet server;

the applet server sends the message to the session manager;

the session manager passes the message and a send request to the CMC API;

the CMC API sends the message to a Transport Service Provider, and the Transport Service Provider transmits the message via a gateway and then returns a success or a failure result to the CMC API;

the CMC API passes the success/failure result to the session manager;

the session manager passes the success/failure result to the applet server; and the applet server passes the success/failure result to the applet, and the applet notifies the subscriber whether the message has been sent or not sent.

30. A Universal Messaging system as recited in claim 22, wherein the system performs a "Delete Message" process that includes the following transactions:

a subscriber selects a message (voice, fax, or e-mail) for deletion, and an applet passes the delete request, including Session ID and Message ID, to the applet server;

the applet server passes the delete request and information to the session manager;

the session manager validates the session and, if successful, passes the delete request and information to the CMC API;

the CMC API passes the delete request to a message store and, if the message to be deleted is a voice or fax message, also sends a delete request to the voice/fax messaging system, and the voice/fax messaging system deletes the message from the voice/fax message store;

the CMC API sends a success or failure result to the session manager;

the session manager passes the result to the applet server; and the applet server passes the result to an applet in the remote client, and the client notifies the subscriber whether the message has been deleted or not deleted.

31. A Universal Messaging system as recited in claim 22, wherein the system performs a "New Message List" process that includes the following transactions:

a subscriber accesses a Custom Client in the voice/fax messaging system;

the Custom Client retrieves new fax and voice message counts, and also sends a request for a new e-mail message count to the CMC API;

the CMC API requests and receives a count of new e-mail messages from the e-mail message store;

the CMC API passes the new e-mail message count back to the Custom Client; and the Custom Client presents the new message counts to the user.

32. A Universal Messaging system as recited in claim 22, wherein the system performs a "Listening to E-mail Headers" process that includes the following transactions:

a subscriber employs the remote client to select a "Listen to e-mail headers" option, and to send a request for a first e-mail header to a Custom Client of the voice/fax messaging system;

the Custom Client sends a request for the first e-mail header to the CMC API;

the CMC API requests and receives the e-mail header specified by the Custom Client from the e-mail message store;

the CMC API passes the e-mail message header back to the Custom Client; and the Custom Client plays the message header for the subscriber.

* * * * *